United States Patent
Lin et al.

(10) Patent No.: US 11,941,822 B2
(45) Date of Patent: *Mar. 26, 2024

(54) VOLUMETRIC SAMPLING WITH CORRELATIVE CHARACTERIZATION FOR DENSE ESTIMATION

(71) Applicant: QUALCOMM Incorporated, San Diego, CA (US)

(72) Inventors: Jamie Menjay Lin, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,730

(22) Filed: Mar. 8, 2023

(65) Prior Publication Data

US 2023/0222673 A1 Jul. 13, 2023

Related U.S. Application Data

(63) Continuation of application No. 17/344,283, filed on Jun. 10, 2021, now Pat. No. 11,640,668.

(51) Int. Cl.
  *G06T 7/246* (2017.01)
  *G06F 18/24* (2023.01)
  *G06T 7/73* (2017.01)

(52) U.S. Cl.
  CPC .............. *G06T 7/248* (2017.01); *G06F 18/24* (2023.01); *G06T 7/74* (2017.01); *G06T 2207/10016* (2013.01)

(58) Field of Classification Search
  CPC ........... G06T 7/248; G06T 7/74; G06T 7/246; G06T 2207/10016; G06T 2207/10024; G06T 2207/20016; G06T 2207/20076; G06T 2207/20084; G06T 2207/30241; G06F 18/24
  See application file for complete search history.

(56) References Cited

U.S. PATENT DOCUMENTS

| | | | |
|---|---|---|---|
| 9,008,363 B1 | 4/2015 | Klier | |
| 10,628,961 B2 | 4/2020 | Sundaresan et al. | |
| 11,640,668 B2 * | 5/2023 | Lin | G06T 7/248 |
| | | | 382/103 |

(Continued)

OTHER PUBLICATIONS

International Search Report and Written Opinion—PCT/US2022/023548—ISA/EPO—dated Jul. 18, 2022.

(Continued)

*Primary Examiner* — John B Strege
(74) *Attorney, Agent, or Firm* — Polsinelli/Qualcomm

(57) ABSTRACT

Systems and techniques are described herein for performing optical flow estimation for one or more frames. For example, a process can include determining an optical flow prediction associated with a plurality of frames. The process can include determining a position of at least one feature associated with a first frame and determining, based on the position of the at least one feature in the first frame and the optical flow prediction, a position estimate of a search area for searching for the at least one feature in a second frame. The process can include determining, from within the search area, a position of the at least one feature in the second frame.

28 Claims, 16 Drawing Sheets

(56) References Cited

U.S. PATENT DOCUMENTS

| | | |
|---|---|---|
| 2011/0110560 A1 | 5/2011 | Adhikari |
| 2013/0135312 A1 | 5/2013 | Yang et al. |
| 2015/0154450 A1 | 6/2015 | Yan |
| 2016/0148054 A1 | 5/2016 | Han et al. |
| 2017/0102467 A1 | 4/2017 | Nielsen et al. |
| 2019/0095745 A1 | 3/2019 | Bao et al. |
| 2019/0197321 A1 | 6/2019 | Hughes et al. |
| 2021/0004933 A1 | 1/2021 | Wong et al. |
| 2021/0233257 A1 | 7/2021 | Simon |
| 2021/0368153 A1 | 11/2021 | Wang et al. |
| 2022/0101539 A1 | 3/2022 | Lin et al. |
| 2022/0201242 A1 | 6/2022 | Lu et al. |
| 2022/0301275 A1 | 9/2022 | Khadloya et al. |
| 2022/0398747 A1 | 12/2022 | Lin et al. |

OTHER PUBLICATIONS

Mingzhu S., et al., "A Multi-Target Tracking Platform for Zebrafish Based on Deep Neural Network", 2019 IEEE 9th Annual International Conference on Cyber Technology in Automation, Control, and Intelligent Systems (Cyber), IEEE, Jul. 29, 2019 (Jul. 29, 2019), pp. 637-642, XP033756855, DOI: 10.1109/CYBER46603.2019. 9066755, [Retrieved on Apr. 13, 2020] Abstract Figure 3.

* cited by examiner

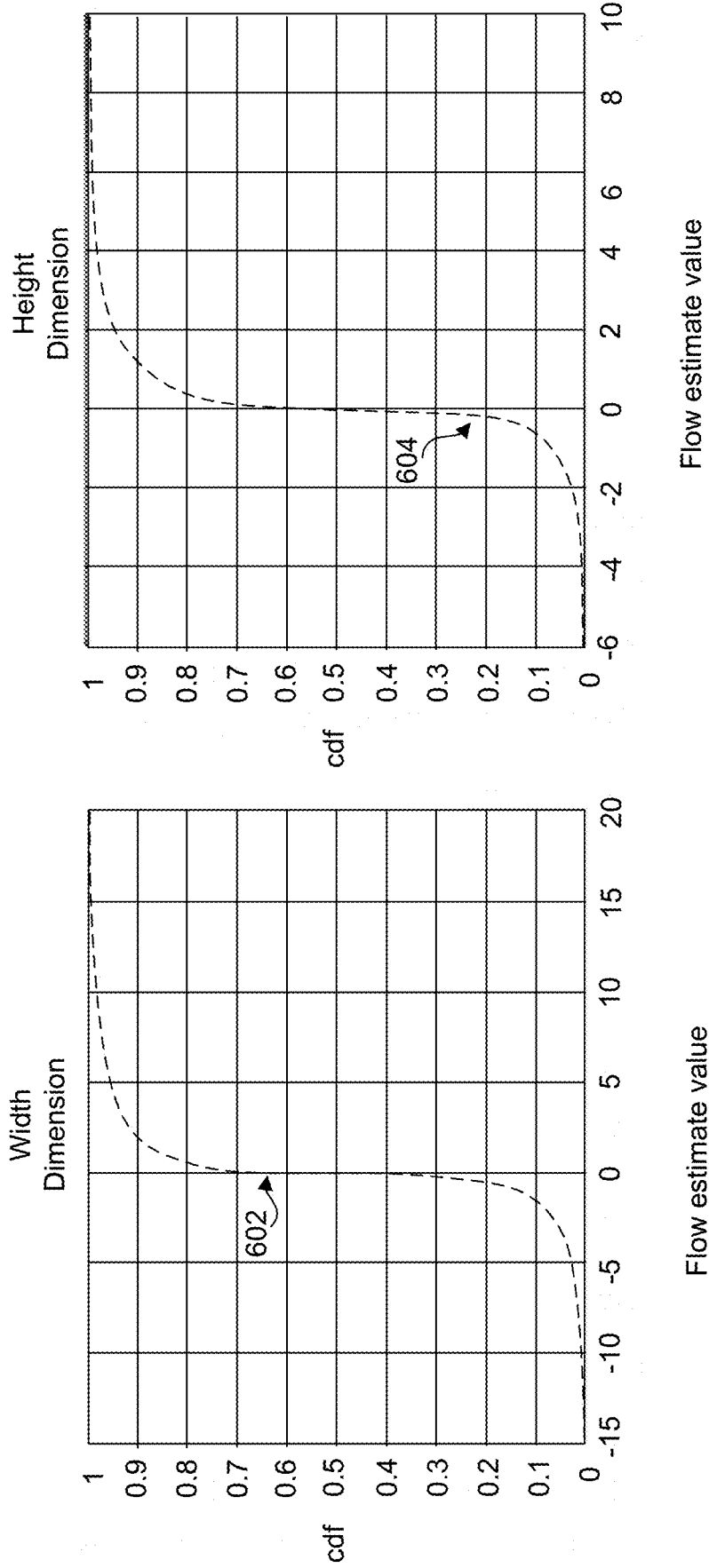

VOLUMETRIC SAMPLING WITH CORRELATIVE CHARACTERIZATION FOR DENSE ESTIMATION

This application is a continuation of U.S. Non-Provisional application Ser. No. 17/344,283, filed Jun. 10, 2021 and titled "VOLUMETRIC SAMPLING WITH CORRELATIVE CHARACTERIZATION FOR DENSE ESTIMATION," which is hereby incorporated by reference in its entirety and for all purposes.

FIELD

The present disclosure generally relates to optical flow estimation. In some examples, aspects of the present disclosure are related to performing optical flow estimation using correlation volumes in a computationally-efficient and memory-efficient manner.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A common type of processing performed on a sequence of frames is motion estimation, which involves tracking the motion of objects or points across multiple frames. For example, motion estimation can include determining an optical flow map that describes the displacement of pixels in a frame relative to corresponding pixels in previous frames. Motion estimation can be used in various applications, including computer vision systems, extended reality systems, data compression, image segmentation, autonomous vehicle operation, among other applications.

SUMMARY

Systems and techniques are described for performing optical flow estimation for frames using volumetric sampling. According to at least one illustrative example, a method of optical flow estimation of one or more frames is provided. The method includes: determining an optical flow prediction associated with a plurality of frames; determining a position of at least one feature associated with a first frame; determining, based on the position of the at least one feature in the first frame and the optical flow prediction, a position estimate of a search area for searching for the at least one feature in a second frame; and determining, from within the search area, a position of the at least one feature in the second frame.

In another example, an apparatus for optical flow estimation of one or more frames is provided that includes a memory configured to store data corresponding to one or more frames and one or more processors (e.g., implemented in circuitry) coupled to the memory. The processor is configured to and can: determine an optical flow prediction associated with a plurality of frames; determine a position of at least one feature associated with a first frame; determine, based on the position of the at least one feature in the first frame and the optical flow prediction, a position estimate of a search area for searching for the at least one feature in a second frame; and determine, from within the search area, a position of the at least one feature in the second frame.

In another example, a non-transitory computer-readable medium is provided that has stored thereon instructions that, when executed by one or more processors, cause the one or more processors to: determine an optical flow prediction associated with a plurality of frames; determine a position of at least one feature associated with a first frame; determine, based on the position of the at least one feature in the first frame and the optical flow prediction, a position estimate of a search area for searching for the at least one feature in a second frame; and determine, from within the search area, a position of the at least one feature in the second frame.

In another example, an apparatus for processing one or more frames is provided. The apparatus includes: means for determining an optical flow prediction associated with a plurality of frames; means for determining a position of at least one feature associated with a first frame; means for determining, based on the position of the at least one feature in the first frame and the optical flow prediction, a position estimate of a search area for searching for the at least one feature in a second frame; and means for determining, from within the search area, a position of the at least one feature in the second frame.

In some aspects, determining the position estimate of the search area comprises offsetting the position of the at least one feature associated with the first frame by an optical flow prediction value of the optical flow prediction associated with the at least one feature.

In some aspects, the optical flow prediction value associated with the at least one feature is determined based at least in part on the position of a pixel associated with the at least one feature in the first frame.

In some aspects, the method, apparatuses, and computer-readable medium described above further comprise: performing object detection on the at least one feature to determine an object type associated with the at least one feature; and determining the optical flow prediction based on the object type associated with the at least one feature.

In some aspects, a plurality of features associated with the first frame comprises respective features corresponding to pixels of the first frame.

In some aspects, the at least one feature associated with the first frame comprises a pixel location of at least a portion of an object in the first frame.

In some aspects, determining the optical flow prediction comprises obtaining an optical flow vector corresponding the pixel location of at least the portion of the object.

In some aspects, the search area includes at least an estimated pixel position of the at least one feature in the second frame.

In some aspects, the estimated pixel position is centered within the search area.

In some aspects, the estimated pixel position is off-center with respect to the search area.

In some aspects, the search area comprises a rectangle having a height and a width, wherein the height and width are different.

In some aspects, the first frame precedes the second frame in a frame sequence.

In some aspects, the method, apparatuses, and computer-readable medium described above further comprise: for each feature of a plurality of features in the first frame, determining a corresponding estimated position of the plurality of features in the second frame.

In some aspects, the optical flow prediction comprises a flow target map.

In some aspects, the optical flow prediction corresponding to the at least one feature is based on at least a third frame, wherein the third frame precedes the first frame and the second frame in a frame sequence.

In some aspects, the apparatus is, is part of, and/or includes a mobile device (e.g., a mobile telephone or so-called "smart phone" or other mobile device), an extended reality device (e.g., a virtual reality (VR) device, an augmented reality (AR) device, or a mixed reality (MR) device), a personal computer, a laptop computer, a server computer, a camera, a vehicle or a computing device or component of a vehicle, a wearable device, a television (e.g., a network-connected television), or other device. In some aspects, the apparatus includes a camera or multiple cameras for capturing one or more frames or images. In some aspects, the apparatus includes a display for displaying one or more frames or images, virtual content, notifications, and/or other displayable data. In some aspects, the apparatuses described above can include one or more sensors (e.g., one or more inertial measurement units (IMUs), such as one or more gyroscopes, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 6A, FIG. 6B, FIG. 6C, and FIG. 6D are illustrations of cumulative distribution functions of example optical flow datasets, in accordance with some examples;

DETAILED DESCRIPTION

Figure 1:
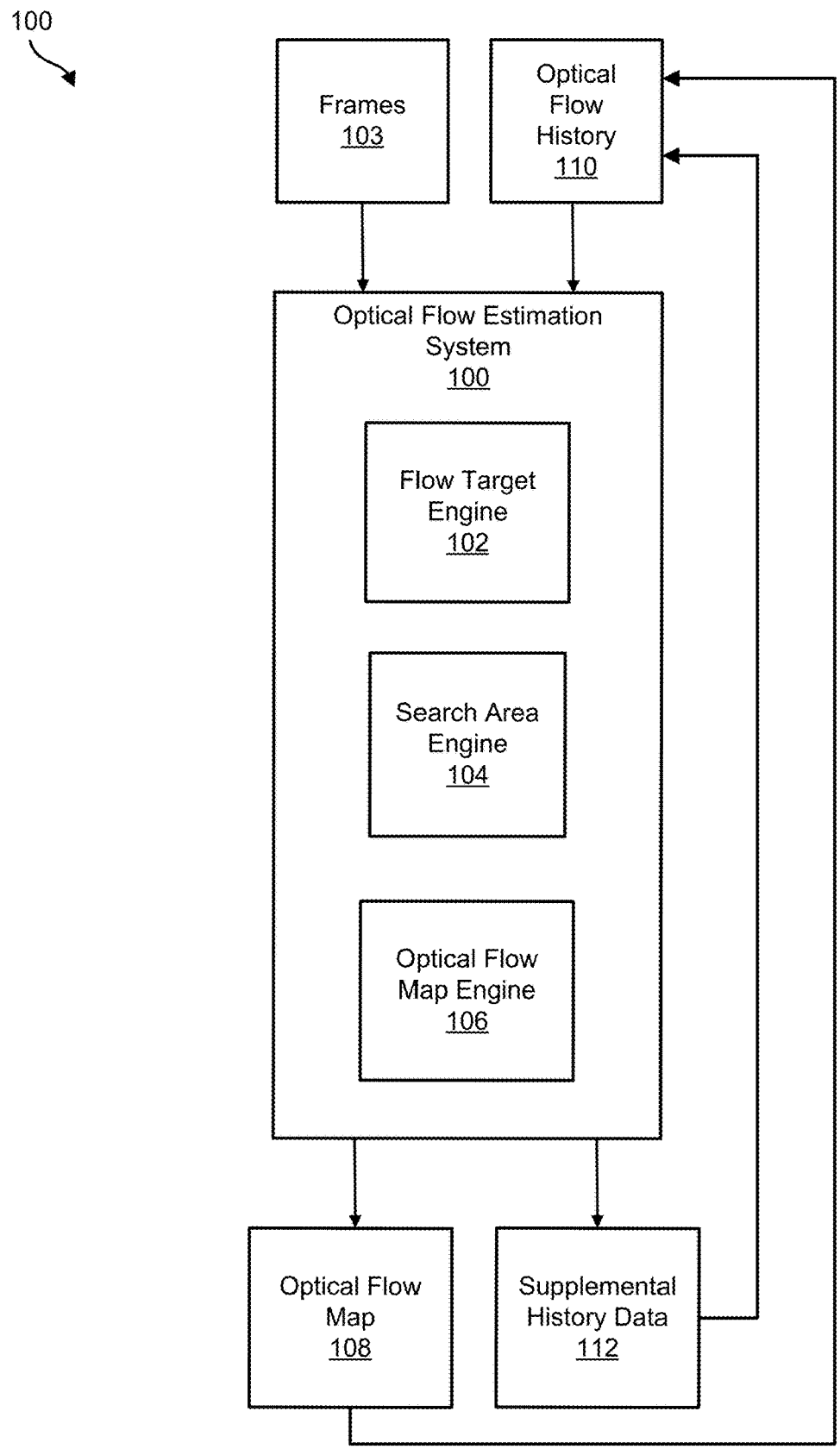
FIG. 1 is a block diagram illustrating an example optical flow estimation system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Motion estimation is the task of tracking the movement of one or more regions (e.g., an object or part of an object, an instance or a part of an instance, a background portion of a scene or a part of the background portion, etc.) across a sequence of frames. In some cases, motion estimation can be performed using optical flow estimation techniques. For example, an optical flow estimation system can identify a pixel of a frame (also referred to as a source frame) that corresponds to a portion of a real world object. The optical flow estimation system can determine a corresponding pixel (e.g., a pixel that depicts the same portion of the real world object) within a subsequent frame (sometimes referred to as a target frame). The optical flow estimation system can estimate the motion of the object between the frames (e.g., between the source frame and the target frame) by determining an optical flow vector that corresponds to the displacement and/or distance between the pixel in the source frame and the corresponding pixel in the target frame. For instance, the optical flow vector can indicate the displacement (e.g., corresponding to the direction and distance of movement) between coordinates corresponding to the initial pixel (from the source frame) and coordinates corresponding to the subsequent pixel (from the target frame).

In some cases, optical flow estimation systems may determine one or more optical flow maps. An optical flow map can include one or more optical flow vectors corresponding to motion between two frames. In some examples, an optical flow map can include an optical flow vector for each pixel (or approximately each pixel) within a frame. Optical flow maps that include an optical flow vector for each pixel (or approximately each pixel) within a frame can be referred to as dense optical flow maps.

In some cases, large amounts of time and/or computing power may be required to generate dense optical flow maps, which can be detrimental for many applications of motion estimation. Examples of applications that utilize motion estimation include various computer vision tasks and camera applications, where object (pixel) motions are involved, including video recognition, autonomous driving, video compression, object and/or scene tracking, visual inertial odometry (VIO), video object segmentation, extended reality (e.g., virtual reality, augmented reality, and/or mixed reality), among others. Higher performance of optical flow estimation for execution in chips and/or devices is desirable, which can result in higher accuracy, less computational complexity, lower latency, lower power consumption, less memory size requirements, among other benefits.

As noted above, optical flow can involve a dense correspondence estimation problem between a pair of frames or images. Existing solutions generally compute dense optical flow for an entire source frame or image (e.g., all pixels in the source frame or image), and search for correspondences within an entire target frame or image (e.g., by searching all pixels in the target frame or image). The approach of searching within all pixels of a target frame for a corresponding pixel can result in a significantly large search area and/or search volume (e.g., a correlation volume) which in turn may result in unnecessarily high computation complexity, higher latency, higher power consumption, and/or higher memory requirement.

Some existing optical flow estimation systems perform optical flow estimation by searching for correspondence between each of N pixels of the source frame within each of N pixels of the target frame. Correlation between the N pixels of the source frame and N pixels of the target frame can be achieved by forming a correlation volume containing N×N values. One example of such an optical flow estimation using a correlation volume is described in Zachary Teed et al. "RAFT: Recurrent All-Pairs Field Transforms for Optical Flow," 2020, which is hereby incorporated by reference in its entirety and for all purposes. The amount of memory and computation effort required to perform this conventional optical flow estimation scales with the size of the input source frame according to big O notation $O(N^2)$. The big O notation represents how the order of magnitude of computation and memory requirements grows as the input size grows.

In order to perform optical flow estimation quickly, such as in real-time optical flow estimation, a correlation volume can be stored in low-latency memory of a computing system (e.g., computing system 1100 described below). The lowest latency memory in a computing system, sometimes referred to as tightly coupled memory (TCM), may be limited in size. For example, TCM may be included on the same silicon die or within the same package as the processor of the computing system, limiting the available size available for the TCM. In some cases, when the size of the correlation volume exceeds the size of the TCM, some or all of the correlation volume can be stored in slower memory, such as memory accessible to the processor by direct memory access (DMA). Accordingly, techniques are needed that can reduce the required size of the correlation volume, which can enable faster optical flow estimation in systems that have limited available TCM.

Systems, apparatuses, methods, and computer-readable media (collectively referred to as "systems and techniques") are described herein for performing optical flow estimation for frames using volumetric sampling. A frame can also be referred to herein as an image. In some cases, an optical flow estimation system can determine a subset of pixels (referred to herein as a flow search area) of a target frame for performing optical flow estimation for each pixel of a source frame. In some cases, the optical flow estimation system can generate a dense optical flow map based on searching for correspondence of the pixels of the source frame within the flow search areas of the target frame (e.g., by including the pixels of the flow search area within a correlation volume).

The optical flow estimation system can perform optical flow estimation in flow search areas of the target frame that can contain significantly fewer pixels than conventional full frame optical flow estimation. The optical flow estimation system can generate optical flow maps with reduced latency and/or fewer computing resources. For example, the optical flow estimation system can result in optical flow estimation being performed within flow search areas that include 20% of the pixels of the target frame, flow search areas that include 10% of the pixels of the target frame, flow search areas that include 5% of the pixels of the target frame, flow search areas that include 2.5% of the pixels of the target frame, or any other number based on the techniques described herein.

In some examples, the size of the flow search areas in the target frame can be set to a constant size based on characteristics of the video data being analyzed, limitations of motion based on physics, a combination thereof, and/or other factors. The optical flow estimation system can search for correspondence of each of N pixels of a source frame within a constant C pixels of a flow search area in the target frame. Correlation between the N pixels of the source frame and C pixels per source volume can be achieved by forming a correlation volume containing N×C values. In the description below, this technique can be referred to as volumetric sampling. The amount of memory and computational effort required to perform optical flow estimation within the constant flow search area scales with the size of the input source frame according to the big O notation $O(N)$. As the number of pixels N of the source frame grows, the flow search area size can remain constant, in which case the growth no longer scales quadratically, but is instead linear with respect to N. The volumetric sampling technique described herein can be used with any technique that involves the use of a correlation volume (or a cost volume) to perform correspondence estimation, such as semantic matching estimation, geometric matching estimation, optical flow, scene flow, or any other computation that employs similar techniques.

In some aspects, the optical flow estimation system can determine the size of flow search areas based on characteristics of the video data that is being analyzed by the optical flow estimation system. In some examples, characteristics of the video data can be determined based on a cumulative distribution function (CDF) of the optical flow vector values generated by the optical flow estimation system. In some examples, the CDF can be generated based on a representative dataset that includes data similar to the optical flow estimation task that the optical flow estimation system is designed to address. For example, the optical flow estimation system, which can be configured to analyze vehicular traffic data, can set the size of its flow search area based on the CDF of a dataset that contains video of the vehicular traffic. In one illustrative example, the flow search area can be sized such that 98% of the optical flow vectors in each motion direction will fall within the search area. For example, if 98% of the optical flow vectors in a given dataset indicate horizontal motion between three pixels to the left and two pixels to the right, the width of the flow search area can be set to five. In another example, if 98% of the optical flow vectors in a given dataset indicate vertical motion between two pixels up and eight pixels down, the height of the flow search area can be set to ten. In some cases, the size of the flow search areas can be determined by a neural network based machine learning system and/or algorithm (e.g., a deep neural network).

In some aspects, the optical flow estimation system can determine a flow target map. The flow target map can provide initial estimated positions of pixels in the target frame. In some cases, the initial estimated positions of the pixels can be included within the flow search areas. In some examples, the initial estimated pixel positions can be centered within the corresponding flow search area. In some aspects, the initial estimated pixel positions can be positioned off-center relative to one or more dimensions of the flow search area. In some aspects, the optical flow estimation system can determine a flow target map based upon optical flow history information. In some implementations, the optical flow history information can include information about previous optical flow maps calculated by the optical for estimation system. In some implementations, the optical flow history information can include information about objects detected in the frames corresponding to the optical flow maps so that the optical flow map vectors can be correlated with motion of specific objects. By providing the optical flow estimation system with good initial estimates for the location of source pixels in the target frame, the accuracy of optical flow estimation can be improved. In some cases, having an initial estimate for the movement direction of a pixel means that the optical flow estimation system can utilize a smaller flow search area. As described in more detail below, a neural network based machine learning system and/or algorithm (e.g., a deep neural network) can be used to determine flow target maps and/or flow search areas within a target frame.

Further details regarding systems for optical flow estimation using volumetric sampling are provided herein with respect to various figures. FIG. 1 is a diagram illustrating an example of an optical flow estimation system 100 that can perform an optical flow estimation process. The optical flow estimation system 100 includes various components, including a flow target engine 102, a search area engine 104, and an optical flow map engine 106. The components of the optical flow estimation system 100 can include electronic circuits or other electronic hardware, which can include one or more programmable electronic circuits (e.g., microprocessors, graphics processing units (GPUs), digital signal processors (DSPs), central processing units (CPUs), or other suitable electronic circuits), computer software, firmware, or any combination thereof, to perform the various operations described herein. While the optical flow estimation system 100 is shown to include certain components, one of ordinary skill will appreciate that the optical flow estimation system 100 can include more or fewer components than those shown in FIG. 1. For example, the optical flow estimation system 100 may also include, in some instances, one or more memory (e.g., RAM, ROM, cache, buffer, and/or the like) and/or processing devices that are not shown in FIG. 1.

The optical flow estimation system 100 can be part of a computing device or multiple computing devices. In some cases, the computing device (or devices) that includes the optical flow estimation system 100 can also include one or more wireless transceivers for wireless communications and/or a display for displaying one or more frame or images. In some examples, the computing device that includes the optical flow estimation system 100 can be an electronic device, such as a camera (e.g., a digital camera, an IP camera, a video camera, a camera phone, a video phone, or other suitable capture device), a mobile or stationary telephone handset (e.g., smartphone, cellular telephone, or the like), a desktop computer, a laptop or notebook computer, a tablet computer, an extended reality device (e.g., a virtual reality device, an augmented reality device, and/or a mixed reality device), a vehicle or a computing device or component of a vehicle, a set-top box, a television, a display device, a digital media player, a video gaming console, a video streaming device, or any other suitable electronic device.

The optical flow estimation system 100 can obtain frames 103 as input. In some examples, the optical flow estimation system 100 can perform the optical flow estimation process in response to one or more of the frames 103 being captured by a camera or a computing device that includes a camera (e.g., a mobile device, or the like). The frames 103 can include a single frame or multiple frames. In some cases, the frames 103 can include a video frame of a video sequence or a still image of a set of consecutively captured still images. In one illustrative example, a set of consecutively captured still images can be captured and displayed to the user as a preview of a scene that is in the field-of-view of the camera, which can help the user decide when to provide input causing an image to be captured for storage. In another illustrative example, a set of consecutively captured still images can be captured using a burst mode or other similar mode that captures multiple consecutive images. A frame can be a red-green-blue (RGB) frame having red, green, and blue color components per pixel, a luma, chroma-red, chroma-blue (YCbCr) frame having a luma component and two chroma (color) components (chroma-red and chroma-blue) per pixel, or any other suitable type of color or monochrome picture In some examples, the optical flow estimation system 100 can capture the frames 103. In some examples, the optical flow estimation system 100 can obtain the frames 103 from a frame source. In some cases, the frame source can include one or more image capture devices and/or one or more video capture devices (e.g., a digital camera, a digital video camera, a phone with a camera, a tablet with a camera, or other suitable capture device), an image and/or video storage device (including any suitable storage device such as storage device 1130 in FIG. 11 below), an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the optical flow estimation system 100.

In some implementations, the optical flow estimation system 100 and the frame source can be part of the same computing device. For example, in some cases, a camera, phone, tablet, XR device, and/or other device with a frame or image source (e.g., a camera, storage, or the like) can include an integrated optical flow estimation system. In some implementations, the optical flow estimation system 100 and the frame source can be part of separate computing devices. In one illustrative example, the frame source can include one or more cameras, and the computing device including the optical flow estimation system 100 can include a mobile or stationary telephone handset, a desktop computer, a laptop or notebook computer, a tablet computer, or other computing device.

In some examples, the optical flow estimation performed by the optical flow estimation system 100 can be performed using a single camera system of a computing device. In other examples, the optical flow estimation performed by the optical flow estimation system 100 can be performed using a dual camera system of a computing device. In some cases, more than two cameras can be used in a camera system for performing optical flow estimation.

The optical flow estimation system 100 can process frames 103 to generate an optical flow map (e.g., an optical flow map 108) by performing optical flow estimation for pixels within a pair of frames of the frames 103. The optical flow map 108 can include one or more optical flow vectors corresponding to the movement of features and/or pixels between two frames. In some cases, the two frames can be directly adjacent frames within a series of frames. In some cases, the two frames can be separated by one or more intermediate frames (which can be referred to as non-adjacent frames). The frame that occurs earlier in the series of frames between the two frames can be referred to as the source frame and the frame that occurs later in the series of frames can be referred to as the target frame.

In some examples, the optical flow estimation system 100 can obtain an optical flow history 110 as an input. In some instances, the optical flow history 110 can include and/or be based on an optical flow map 108 determined in one or more previous iterations of optical flow estimation by the optical flow estimation system 100. The optical flow history 110 can also include and/or be based on features detected during optical flow estimation, such as features extracted during object detection, semantic segmentation, or the like. Any data contained within the optical flow history 110 in addition to optical flow map 108 data from previous frames will be referred to as supplemental history data 112 herein. For example, the optical flow map 108 may indicate that a pixel located at pixel location L1 had an optical flow value (e.g., an optical flow vector) of V1. The supplemental history data 112 included in optical flow history 110 may include data classifying pixel P1 as part of a particular foreground object, such as a ball. In some cases, supplemental history data 112 can be output by the optical flow estimation system in addition to an optical flow map 108.

In some cases, the optical flow history 110 may be uninitialized, meaning that the optical flow history may at times contain no historical optical flow information, such as when the optical flow estimation system 100 has not processed any of the frames 103. In some examples, the optical flow history 110 can include the most recently determined optical flow map 108. In some cases, the more recently determined optical flow map 108 can correspond to the most recently processed pair of frames of the frames 103. In such a case, the source frame of the current optical flow estimation can be the same as the target frame from the previous optical flow estimation performed by the optical flow estimation system 100. In some cases, there can be a gap in time between the most recently determined optical flow map 108 and the frames of frames 103 currently being processed by the optical flow estimation system 100. In some cases, the optical flow history 110 can include the optical flow map 108 (and in some cases, supplemental history data 112) from optical flow estimation performed on frames two or more frames before the current target frame being processed by the optical flow estimation system 100.

In some examples, optical flow history 110 can include information from multiple frames preceding the target frame being processed by the optical flow estimation system 100. For example, the optical flow history 110 may contain information from at least two frames prior to the current frame being processed by the optical flow estimation system 100. In some examples, the optical flow history 110 can include the optical flow maps 108 from multiple previous frames processed by the optical flow estimation system. In such cases, the optical flow history 110 can also include supplemental history corresponding to each of the previous frames as well. In some cases, the optical flow history 110 may contain one or more optical flow maps 108 without supplemental history information.

In such cases, the flow target engine 102 can apply the available information in the optical flow history to determine initial estimated pixel positions in the target frame. For example, if the optical flow map 108 is available to the flow target engine 102, the flow target engine can determine the initial estimated pixel positions in the target frame by offsetting each pixel position in the source frame by the flow vectors from the optical flow map 108. For example, the optical flow map 108 may indicate that the pixel at location L1 in the previous source frame moved to location L2 in the previous target frame. In such a case, the flow target engine 102 can use location L2 as the initial estimated pixel position in the target frame. When there is no optical flow history 110 information available, the flow target engine 102 may not be able to provide an initial estimated pixel position offset. In such a case, the flow target engine 102 can use the original pixel location in the source frame as the initial estimated position in the target frame. For example, the pixel at location L1 in the source frame can have an initial estimated pixel position of L1 in the target frame.

In some examples, the flow target engine 102 can combine the supplemental history information with the optical flow map 108 to determine initial estimates. For example, the optical flow map 108 may indicate that pixel P3 moved from location L3 in the previous source frame to location L4 in the previous target frame. In some implementations, this displacement vector of the movement from L3 to L4 can be represented by the optical flow vector at location L3 of the optical flow map 108. The supplemental history information may indicate that pixel at location L3 in the previous source frame was part of a ball moving from point A to point B across multiple frames. In such a case, the flow target engine 102 may perform object detection or semantic segmentation and determine that pixel at location L4 in the current source frame is part of the same ball. In such a case, the pixel belonging to the ball may have moved from location L3 to L4 across the previous pair of frames, so the last location of pixel belonging the ball is known by the target map engine. The flow target engine 102 can provide an initial estimate that the pixel at location L4 in the current source frame will move to location L5 in the current target frame, where the offset between location L4 and location L5 is the same as the offset between locations L3 and L4 in the previous iteration of the optical flow estimation system.

The flow target engine 102 can provide initial estimates for where features and/or pixels in the source frame will appear in the target frame being processed by the optical flow estimation system 100. In some cases, flow target engine 102 may have access to multiple previous optical flow maps 108 (e.g., via optical flow history 110) that correspond to multiple preceding frames processed by the optical flow estimation system 100. For instance, the flow target engine 102 can classify and/or label objects in the frame (e.g., using any type or form of object recognition technique, such as using one or more classification neural networks). Based on the classifications and/or labels, the flow target engine 102 can determine pixels corresponding to objects (e.g., a person's face, a ball, a portion of a vehicle, or the like). In some implementations, the flow target engine 102 can determine motion of the objects across multiple frames utilizing optical flow history 110 information from multiple frames to determine a trajectory of the detected objects. For example, the detected object may be a ball thrown across the frame. Between a first and second frame, the ball may have a velocity and/or displacement captured in an optical flow map 108 and incorporated in optical flow history 110. In some cases, the ball may also be detected in a third frame, and the optical flow map 108 generated between the second and third frame may indicate that the ball's velocity has slowed. In some cases, the flow target engine 102 can utilize the information from the optical flow history 110 from multiple previous frames (e.g., two or more optical flow maps) to determine an estimated trajectory for the ball. In some examples, the flow target engine 102 can include a Kalman filter that determines the estimated trajectory of pixels and/or objects. In some cases, the Kalman filter can be used in conjunction with object recognition to determine the estimated trajectory of pixels and/or objects. The calculation of object motion across multiple frames of optical flow history 110 is sometimes referred to as sequential flow consistency or a sequential flow consistency calculation.

In some cases, the optical flow history 110 for multiple frames can be stored in a circular memory that stores optical flow history information for the most recent Y frames, where Y is an integer, such as 3 frames, 5 frames, etc. In some cases, the flow target engine 102 can adaptively change the number of frames of optical flow history stored in the circular memory. For example, if flow target engine 102 is using 5 frames of optical flow history to calculate sequential flow consistency and determines that the motion in a particular sequence of the frames 103 follows a linear consistent pattern, the flow target map may reduce the number of frames of optical flow history 110 stored in the circular memory. For example, the number of frames of optical flow history may be reduced to 3. In another example, the flow target engine 102 may utilize only a single flame of optical flow history 110. For example, flow target engine 102 can apply the optical flow vectors stored in optical flow map 108 of the previous frame to the pixels of the current source frame. If the optical flow estimation system 100 and/or flow target engine 102 determine that the accuracy of optical flow estimates is degrading below an accuracy threshold, the flow target engine 102 can increase the number of frames of optical flow history 110 stored in the circular memory and utilized for sequential flow consistency calculations.

In some cases, the flow target engine 102 can determine the initial estimated pixel and/or feature locations in the target frame using a machine learning system and/or algorithm. For example, the machine learning system and/or algorithm can be any type or form of deep neural network (DNN). In an illustrative example, the machine learning algorithm can include a Visual Geometry Group (VGG) algorithm. In another illustrative example, the machine learning system and/or algorithm can include a residual neural network (ResNet). Any other machine learning system and/or algorithm can be used. In some cases, the neural network can be trained to determine features of objects within frames. The features can include object labels, object classifications, object boundaries, among other features. In some cases, the neural network can be trained by inputting into the neural network many frames or images that have known object features. In some cases, the neural network can also be trained to determine prior motion associated with the determined features by inputting into the neural network many frames or images that have known motion characteristics. After the neural network has been sufficiently trained, the neural network can determine features and/or motion associated with determined features of new frames (e.g., frames 103) input to the neural network during inference.

In some implementations, search area engine 104 can determine a flow search area for searching within the target frame for each pixel of the source frame. In some examples, the search area engine 104 can determine a search area size sufficient for accurate optical flow estimation. In some examples, the search area engine 104 can combine each of the flow search areas in the target frame into a correlation volume. The size of the flow search areas applied by the search area engine 104 can be applied based on characteristics of the data being processed by optical flow estimation system 100. For example, when the optical flow estimation system 100 is processing frames 103 from cartoon animations, the motion of objects may not be limited by physics and a relatively large search area may be required. As described above, the flow search area can be sized according to characteristics of the dataset being analyzed by the optical flow estimation system. In some cases, the size of the flow search area can be determined based on the CDF of an example dataset as described below with regard to Table 1, Table 2, FIG. 6A, FIG. 6B, FIG. 6C, and FIG. 6D. The size of the flow search area selected by search area engine 104 can determine the computational and memory requirements for performing optical flow estimation. Accordingly, the search area engine 104 can also determine the size of the flow search are based at least in part on the available computing and memory resources (e.g., the amount of TCM) and the processing speed requirements for the optical flow estimation (e.g., whether the optical flow estimation needs to occur in real-time). In some cases, a neural network based machine learning system and/or algorithm (e.g., a deep neural network) can be used to determine the size of the flow search area.

In some examples, a confidence level associated with the initial estimated pixel locations by the flow target engine 102 can be adjusted based on the age of the optical flow history 110. The age of the optical flow history 110 can be the number frames 103 between the current target frame being processed by optical flow estimation system 100 and the previous target frame corresponding to the optical flow history 110. For example, a lower confidence level can be applied when the optical flow history 110 is based on a target frame thirty frames preceding the current target frame when compared with an optical flow history 110 based on the immediately preceding frame. In some cases, a lower weighting can be applied to the optical flow history as the confidence level decreases. In such cases, the size of the flow search area applied by the search area engine 104 may be dynamically increased to compensate for the lower confidence level. In some cases, the size of the flow search area applying by the search area engine 104 may be dynamically decreased when there is a higher confidence level in the frames (or entries) stored in the optical flow history 110. For example, as more optical flow history information becomes available and/or if the optical flow history information comes from a frame or frames immediately processing the current frame being processed, the optical flow estimation system 100 can utilize a smaller flow search area. In some cases, the initial estimated pixel positions determined by the flow target engine 102 can be stored in a flow target map. In some cases, the optical flow estimation system 100 can determine a weighting or filtering (with coefficients) to weight among the available frames (or entries) in the optical flow history 110. For example, the weighting can include finite impulse response filters, infinite impulse response filters, monotonic reducing weights based on time distance, equal weights (boxcar), any combination thereof, and/or other weighting.

The optical flow map engine 106 of the optical flow estimation system 100 can determine optical flow vectors corresponding to pixels of between a source frame and a target frame of the frames 103. In some cases, an optical flow vector can indicate a direction and magnitude of the movement of the pixel. For example, an optical flow vector can describe a displacement between a coordinate corresponding to the location of the pixel within an initial frame (e.g., the source frame) and a coordinate corresponding to the location of the pixel within a subsequent frame (e.g., the target frame). The optical flow map engine 106 can determine the location of the pixel within the target frame using any type or form of optical flow estimation technique. In some cases, the optical flow map engine 106 can determine optical flow vectors between each pixel in the source frame and pixels of the target frame based on the flow search areas determined by the search area engine 104. For example, the optical flow map engine 106 can perform an all-pairs correlation within a correlation volume generated by the search area engine 104. Additionally or alternatively, optical flow map engine 106 can determine an optical flow vector using any suitable machine learning algorithm (e.g., a deep neural network). In some cases, the machine learning algorithm used to determine optical flow vectors can be different than the machine learning algorithm used to select the initial estimated pixel position (e.g., the flow target engine 102).

In some cases, the all-pair correlation can determine which features in the target frame correspond to features in the source frame. The optical flow map engine 106 can generate values for the optical flow map 108 for the target frame based on the optical flow vectors. In some examples, the optical flow map engine 106 can generate an incremental optical flow map that corresponds to motion estimations between two adjacent frames. In other examples, the optical flow map engine 106 can generate a cumulative optical flow map (in which case the optical flow map is adjusted or updated at each frame) that corresponds to motion estimations between two frames having one or more intermediate frames between them. For example, the optical flow map engine 106 can determine incremental optical flow maps between all or a portion of directly adjacent frames within a series of frames. The optical flow map engine 106 can use the incremental optical flow maps to update a cumulative optical flow map between the first frame of the series of frames and a current frame of the series of frames. To update the cumulative optical flow map, the optical flow map engine 106 can sum incremental optical flow vectors between the current frame and the previous frame with corresponding optical flow vectors of the cumulative optical flow map. In some cases, the optical flow map engine 106 can use incremental optical flow maps to update a cumulative optical flow map between multiple iterations of optical flow estimation between two adjacent frames.

The optical flow map 108 output by the optical flow map engine 106 can be used for various purposes and/or tasks. For example, as mentioned above, optical flow maps may be utilized in applications including computer vision systems, extended reality systems, data compression, image segmentation, autonomous vehicle operation, among other applications.

Figure 2:
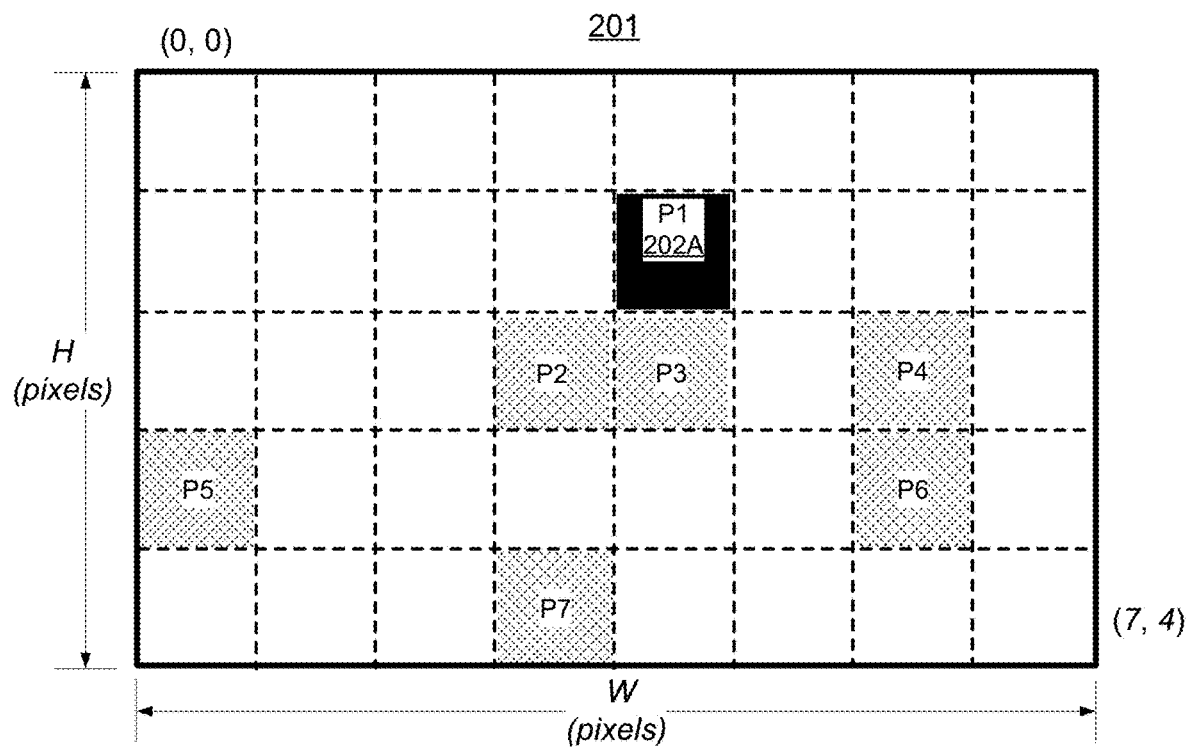
FIG. 2 is an illustration of optical flow estimation for a pixel, in accordance with some examples.
Figure 2:
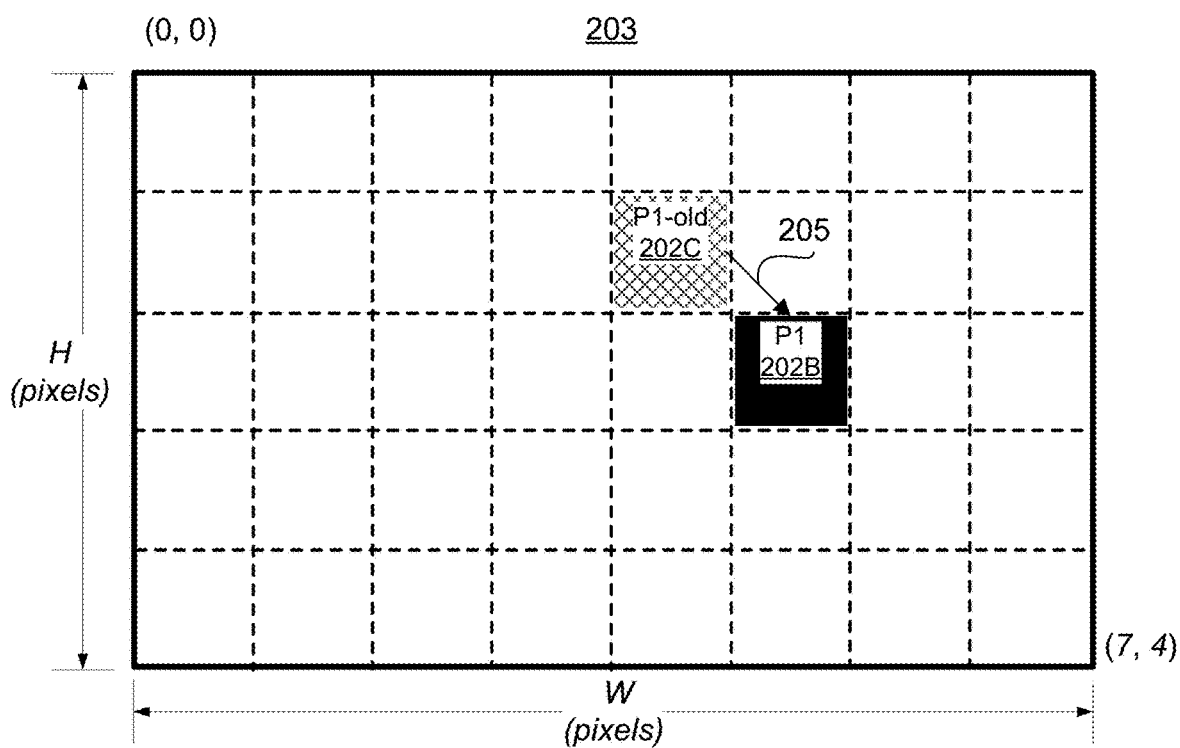

FIG. 2 is a diagram illustrating an example of the optical flow estimation process that may be performed by the optical flow estimation system 100 of FIG. 1. FIG. 2 illustrates an example of a first frame 201 (also referred to as the source frame) and a second frame 203 (also referred to as the target frame) of a sequence of frames. The frames 201 and 203 can correspond to one of frames 103 of FIG. 1. The frame 201 is shown with dimensions of W pixels wide by H pixels high (denoted as W×H). One of ordinary skill will understand that the frame 201 can include many more pixel locations than those illustrated in FIG. 2. For example, the frame 201 can include a 4K (or ultra-high definition (UHD)) frame at a resolution of 3,840×2,160 pixels, an HD frame at a resolution of 1,920×1,080 pixels, or any other suitable frame having another resolution. Frame 201 includes pixels P1, P2, P3, P4, P5, P6, and P7. As shown, pixel P1 has a location 202A. The pixel location 202A can include a (W, H) pixel location of (4, 1) relative to the top-left-most pixel location of (0, 0). In an illustrative example, pixels P1, P2, and P3 may correspond to the tip of a person's nose, and pixel P5 may correspond to a boundary between the person's face and the background of the frame.

The second frame 203 has the same corresponding pixel locations as that of the first frame 201 (with dimension W×H), such as the top-left pixel (at pixel position or location (0, 0)) in the frame 201 corresponds to the top-left pixel (at pixel position or location (0, 0)) in the second frame 203. As shown, the pixel P1 has moved from the pixel location 202A in the first frame 201 to updated pixel P1 location 202B in the second frame 203. The original location 202C of pixel P1 from the first frame 201 is shown in the second frame 203 to allow easy visualization of the location change of pixel P1 between first frame 201 and second frame 203. It should be understood that the pixel location 202C in frame 203 may be the location in the second frame 203 occupied by a different pixel from the first frame 201 (e.g., P2, P3, P4, P5, P6, P7, or any other pixel from frame 201). In some cases, pixel location 202C may be occupied by data that was not present in any pixel in frame 201 (e.g., a new object coming into frame).

The updated pixel P1 location 202B can include a (W, H) pixel location of (5, 2) relative to the top-left-most pixel location of (0, 0). An optical flow vector can be computed for the pixel P1, indicating the velocity, displacement, or optical flow of the pixel P1 from the first frame 201 to the second frame 203. In one illustrative example, the optical flow vector (illustrated by vector 205) for the pixel P1 between the frames 201 and 203 is (1, 1), indicating the pixel P1 has moved one pixel location to the right and one pixel location down. In some cases, the optical flow estimation system 100 can determine a total of W×H optical flow vectors, which can represent one optical flow vector for each pixel location in the source frame, including determining optical flow vectors for the remaining pixels P2-P7 (not shown for simplicity). The W×H optical flow vectors can be stored in an optical flow map, such as optical flow map 108 of FIG. 1. As described above and below, the computational effort and memory requirements for determining the W×H optical flow vectors of the optical flow map can depend on the size of the search area (and in some cases, resulting search volume) used to locate each pixel in the target frame.

Figure 3A:
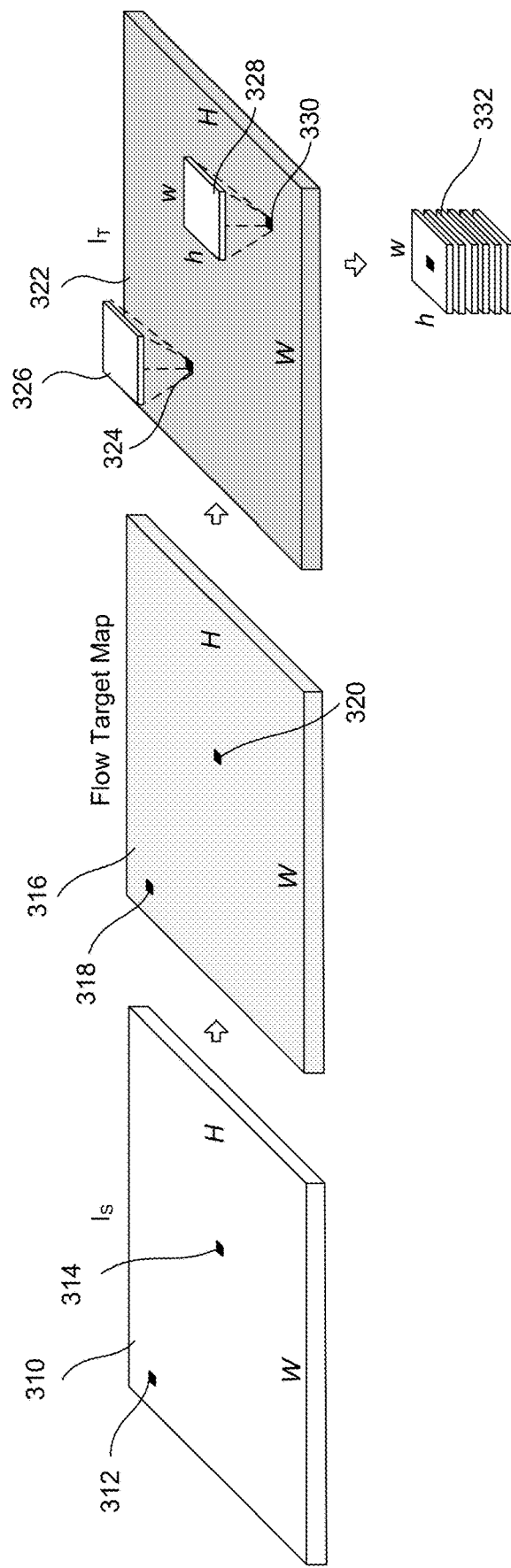
FIG. 3A and FIG. 3B are illustrations of flow target maps and flow search areas, in accordance with some examples.

FIG. 3A is a diagram illustrating an example of a flow target map 316 and flow search areas 326 and 328 that can be utilized in an optical flow estimation system such as optical flow estimation system 100 of FIG. 1. FIG. 3A illustrates two frames, a source frame 310 and a target frame 322. The source frame 310 and target frame 322 can have dimensions of a width=W pixels and a height=H pixels, for a total of W×H pixels in each frame. In some implementations, an optical flow estimation system can perform optical flow estimation between the source frame 310 and the target frame 322. In some implementations, a flow target map 316 can include initial optical flow estimates (e.g., offset vectors) that can represent estimated velocities or movement of each of the pixels of source frame 310 into target frame 322. In some examples, as described above, the initial optical flow estimate in the flow target map 316 can be based on an optical flow history, such as optical flow history 110 of FIG. 1. The flow target map can have the same dimensions as the source frame 310 and target frame 322, such as W×H values. During optical flow estimation, the optical flow estimation system can search for each pixel of the source frame 310 in the target frame 322.

In the illustration of FIG. 3A, initial estimated pixel location 324 in the target frame 322 can correspond to the pixel 312 of the source frame 310 offset by the corresponding value 318 in the flow target map 316. As illustrated, pixel 324 of target frame 322 is included within the flow search area 326. An optical flow estimation system according to the present disclosure can utilize the flow search area 326 to determine the optical flow of the pixel 312 between the source frame 310 and the target frame 322. The flow search area 326 can be a rectangle with height=h pixels and width=w pixels and can contain a smaller number of pixels compared to the full target frame 322. In some cases, the flow search areas (including flow search areas 326 and 328) described herein can be a shape other than a rectangle without departing from the scope of the present disclosure. Similarly, the initial estimated pixel location 330 of the target frame can correspond to the pixel 314 of the source frame 310 offset by the corresponding value 320 of the flow target map 316. As illustrated, pixel 330 of target frame 322 is included within the flow search area 328. As should be understood by the illustration of FIG. 3A, each pixel in the source frame 310 can be offset by a corresponding value in the flow target map 316 to determine an initial estimated position of each pixel in the target frame 322. Each pixel in the target frame 322 can also have a corresponding flow search area in the target frame 322 that contains its initial estimated position. In some implementations, the search areas in the target frame 322 corresponding to each pixel of the source frame 310 can be concatenated to form a correlation volume 332. In some examples, by having a flow search area for each pixel that is smaller than the full frame, the total size of the correlation volume can be smaller than a correlation volume that includes a full frame worth of pixels (e.g., W×H pixels corresponding to the target frame 322) for each pixel in the source frame 310. This reduction of the correlation volume can reduce the required size of TCM as well as bring the total computational effort necessary to perform optical flow estimation between the source frame 310 and the target frame 322 from an $O(N^2)$ scale to an $O(N)$ scale as described above.

While the above description of FIG. 3A and other examples provided herein are discussed in terms of pixels of the two-dimensional source frame 310 and target frame 322, the same technique can be applied more generally to features. In one example, the image pixels of source frame 310 and target frame 322 can be treated as features. In another case, the features can be extracted from the source frame 310 and target frame as described above with regard to flow target engine 102 of FIG. 1. In addition, the techniques described herein are not limited to two dimensional feature maps. The use of initial flow estimates in a flow target map 316 and flow search areas can be applied more generally to a source feature map $F_0$ and at target feature map $F_1$. In some aspects, $f_0$ can be a feature point in $F_0$ where $f_0=(c_0^1, c_0^2, \ldots, c_0^D) \in Z^D$ where $c_0^1, c_0^2, \ldots, c_0^D$ are coordinates of the feature point in a D-dimensional feature map and the coordinate values belong to the set of integers Z. Similarly, $f_1$ can be a feature point in $F_1$ where $f_1=(c_1^1, c_1^2, \ldots, c_1^D) \in Z^D$. The feature maps can both have a shape $S^1 \times S^2 \times \ldots \times S^D$.

One illustrative example shape described in FIG. 3A for the two dimensional feature maps is a rectangle with dimensions H×W. For example, source feature map $F_0$ can represent a feature map of dimensions H×W where the features in $F_0$ can be the original images pixel values or can be features extracted from the source frame 310 using object detection, semantic segmentation, or any other suitable feature extraction technique. Similarly, target feature map $F_1$ can represent a feature map of dimensions H×W where the features in $F_1$ can be the original image pixel values or can be features extracted from the target frame 322 by object detection, semantic segmentation of the target frame 322, or any other suitable feature extraction technique.

The optical flow estimation system can determine correspondence between the feature $f_0$ in $F_0$ and the feature $f_1$ in $F_1$. An estimated displacement between $f_0$ and $f_1$ can be denoted by $\Delta=(\Delta^1, \Delta^2, \ldots \Delta^D) \in R^D$. $\Delta$ can be any value representable in $F_0$ and $F_1$, such that $\Delta^i \in [-S^i, S^i]$, $\forall i \in \{1, 2, \ldots, D\}$. For example, a pixel could move from the top left corner of a source frame to the bottom right corner of the target frame, resulting in $\Delta=(S^1, S^2)$.

A flow target map $F_{f,T}$ that includes initial estimated spatial displacement values for the optical flow estimation can also be in the shape of $S^1 \times S^2 \times \ldots \times S^D$. In some cases, if there is no optical flow history available to the optical flow estimation system, the flow target map can contain no initial displacement values such that $F_{f,T}=0$. In some cases, where there is a single previous optical flow estimate $Flow_{Prev}$ available to the optical flow estimation system, the initial estimated displacement values can be set equal to the previous optical flow estimate such that $F_{f,T}=Flow_{Prev}$. In some cases, $Flow_{Prev}$ can also be in the shape of $S^1 \times S^2 \times \ldots \times S^D$. In one illustrative example, $Flow_{Prev}$ can be the most recent optical flow map of dimensions H×W generated by the optical flow estimation system.

In some cases, the optical flow history may include optical flow estimates, semantic segmentation results and/or object detection results (e.g., supplemental history information) for multiple previous frames. In such cases, the optical flow estimation system can derive an object motion model (also referred to herein as sequential flow consistency) based on the multiple previous frames of optical flow history. In some cases, a neural network based machine learning model system and/or algorithm (e.g., a deep neural network) can be used to determine the trajectories of one or more objects based on the history of observations. In some cases, a Kalman filter can be utilized to determine the trajectories of one or more objects based on the optical flow history for the multiple previous frames. In one example, a sequence of frames in a video may contain a ball moving from point A to point B. The ball may for example, be slowing in velocity or lowering in height due to gravity. The optical flow estimation system (e.g., using flow target engine 102) can produce an estimated trajectory of the ball and estimate the likely position of the ball in the target frame. In some cases, the optical flow estimation system can use the estimated trajectory (also referred to herein as sequential flow consistency) to determine the initial estimated spatial displacement value for pixels and/or features of the ball. In some cases, the sequential flow consistency term can be expressed as an offset from the previous optical flow map value $Flow_{Prev}$. In cases where multiple frames of optical flow history are available the initial estimated displacement values can be set equal to the previous optical flow estimate offset by a sequential flow consistency term $\Delta Flow_{SFC}$ such that $F_{f,T}=Flow_{Prev}+\Delta Flow_{SFC}$. As described above, the $\Delta Flow_{SFC}$ can be derived based on temporal/sequential consistency of motion of an object that can be derived from the optical flow history across multiple frames. In some cases, the sequential flow consistency offset can be calculated for all features. In some cases, the sequential flow consistency term can be calculated only for features that exhibit strong sequential flow consistency characteristics. For example, the sequential flow consistency term may only be calculated for foreground objects such as the ball described above. In such cases, the values of the sequential flow consistency vector can be set to zero for pixels and/or features with no corresponding sequential flow consistency calculation.

Figure 3B:
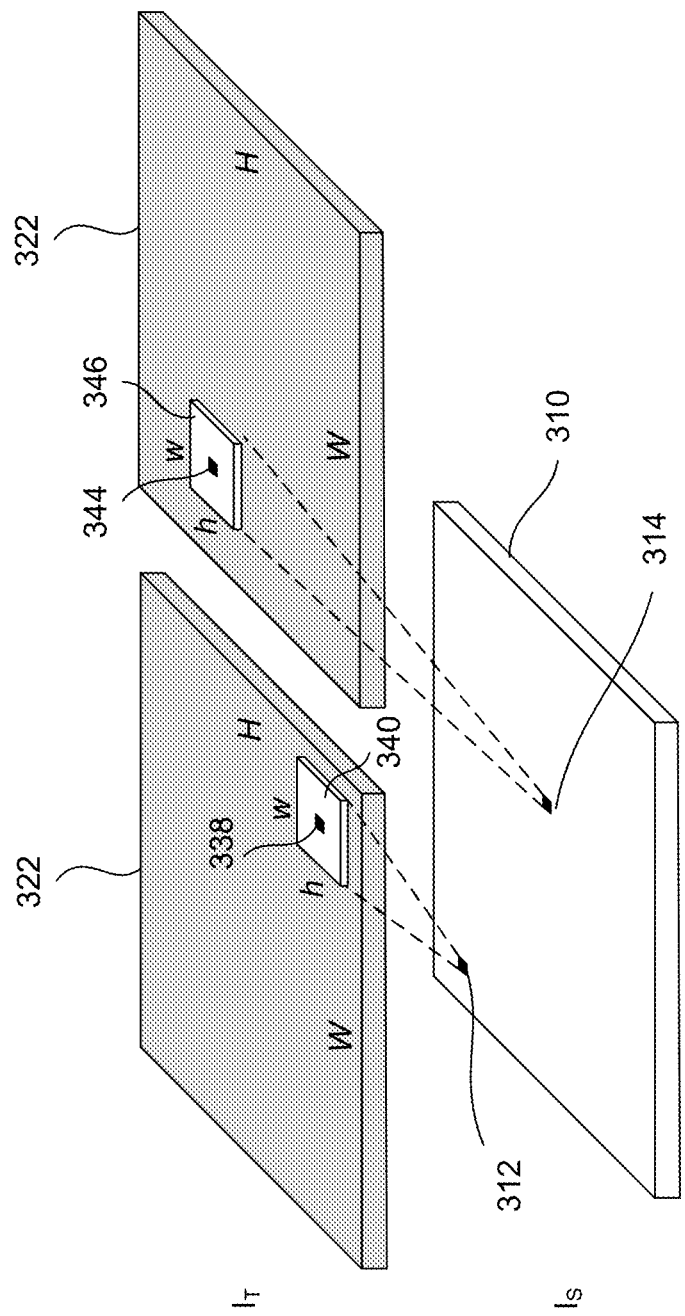

FIG. 3B provides another illustration of relationships between pixels 312 and 314 of the source frame 310 and the corresponding initial estimated pixel positions 338 and 344 and flow search areas 340 and 346 in the target frame 322. As illustrated in FIG. 3B, pixel 312 has an initial estimated pixel position 338 and a corresponding flow search area 340 in the target frame 322. As shown, the initial estimated pixel position 338 falls within the flow search area 340, which has a height=h pixels and a width=w pixels. Similarly, pixel 314 has a corresponding initial estimated pixel position 344 and a corresponding flow search area 346 with height=h pixels and width=w pixels. The initial estimated pixel positions for each pixel in the source frame 310 can be stored in the flow target map (e.g., the flow target map 316 of FIG. 3A). As noted above, the flow search areas 340 and 346 can be included in a correlation volume such as correlation volume 332 of FIG. 3A. In some existing optical flow estimation system implementations, the flow search area for each pixel in the source frame 310 can include the full target frame 322 of pixels. In such an implementation, the flow search area for each pixel can have a width=W pixels and a height=H pixels. In such an implementation, the correlation volume can be formed from a full frame of pixels of the target frame 322.

Figure 4A:
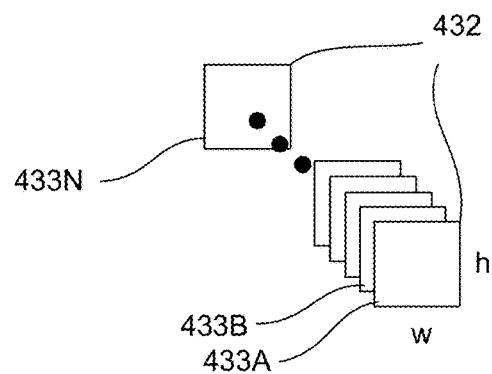
FIG. 4A and FIG. 4B are illustrations of correlation volumes, in accordance with some examples.

FIG. 4A illustrates an example of a correlation volume 432 including flow search areas 433A, 433B, through 433N. The correlation volume 432 can be similar to and perform similar functions as the correlation volume 332 of FIG. 3A. As shown in FIG. 4A, each of the flow search areas 433A, 433B, through 433N can have a width=w features and height=h features such that the total number of values (e.g., feature values) in each flow search area 433A, 433B, through 433N is equal to w×h features. As described above regarding FIG. 3A, the width w and height h of the flow search areas 433A, 433B, through 433N can be smaller than the corresponding width W and height H of the full target frame (e.g., target frame 322). In some implementations, each feature of the source feature map, such as feature map $F_0$, can have a corresponding flow search area. In such implementations, if the source feature map has N features, then correlation volume 432 can include N flow search areas. For example, there can be one flow search area included in correlation volume 432 for each pixel of source frame 310 of FIG. 3A. As described above, source frame 310 can have a height=H pixels and width=W pixels, making N=H×W. In some cases, a feature vector extracted from the source frame 310 can also have a height=H and width=W, making N=H×W. In some implementations, each of the flow search areas 433A, 433B, through 433N can include w×h pixels or features. In such cases, the total number of pixels or features included in the correlation volume 432 can be equal to H×W×w×h.

Figure 4B:
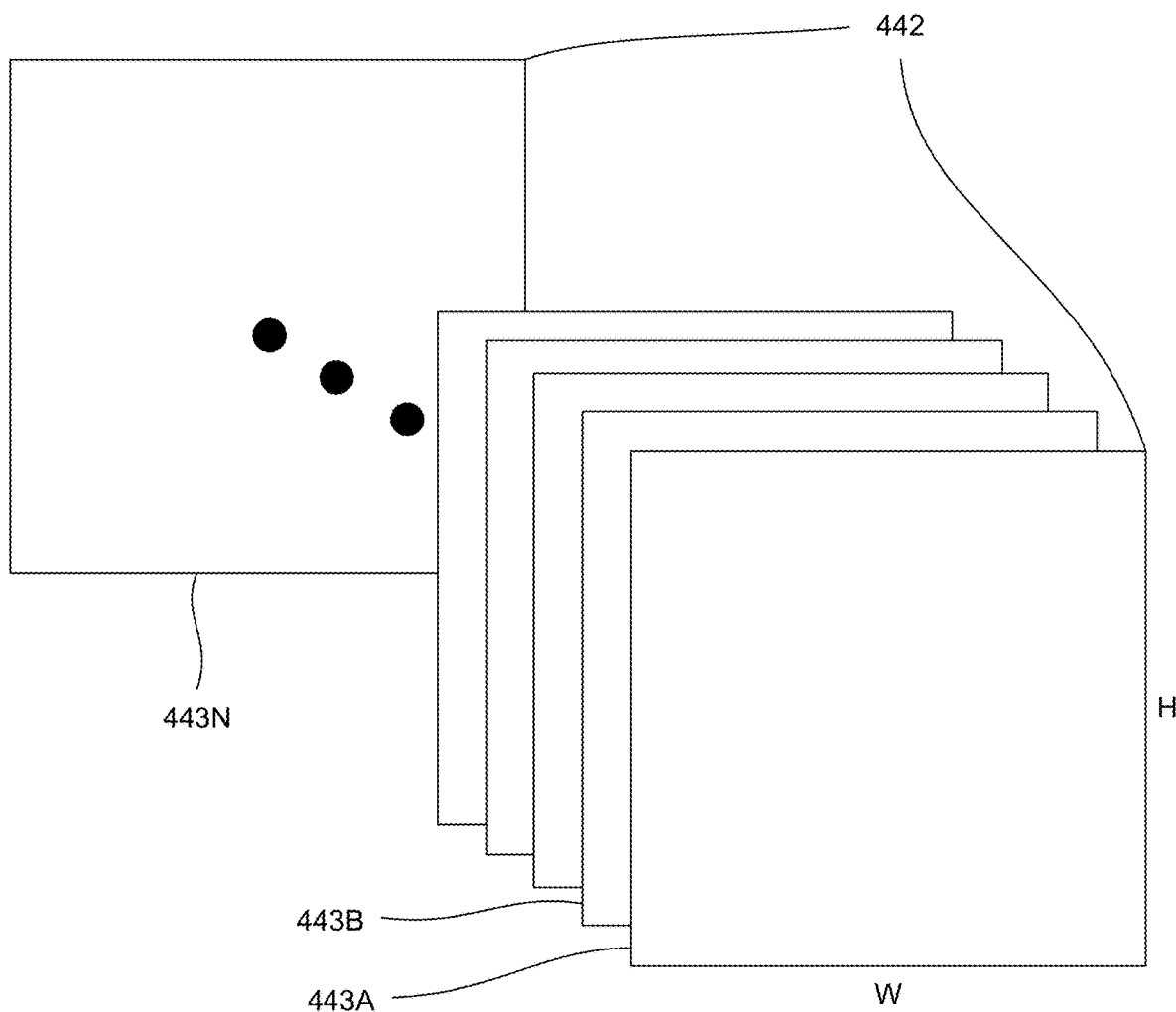

FIG. 4B illustrates an example of a correlation volume 442 including flow search areas 443A, 443B, through 443N that can be used in cases where an optical flow estimation system searches for each pixel of the source frame within each pixel of the target frame. In some implementations, each feature of the source feature map, such as source feature $F_0$, can have a corresponding flow search area. In such implementations, if the source feature map has N features, then correlation volume 442 can include N flow search areas. For example, there can be one flow search area included in correlation volume 442 for each pixel of source frame 310 of FIG. 3A, making N=H×W. In some cases, a feature vector extracted from the source frame 310 can also have a height=H and width=W making N=H×W. In some implementations, each of the flow search areas 443A, 443B, through 443N can include W×H pixels or features. In such cases, the total number of pixels or features in the correlation volume 442 can be equal to H×W×H×W. TABLE 1 below includes example values for H, W, h, and w of different example of an optical flow system implementations according to examples of the present disclosure.

TABLE 1

| Dataset | H | W | H' = H/8 | W' = W/8 | Full Volume H' × W' × H' × W' | Case 1: Volumetric Sampling (VS) h = 32 w = 32 |
|---|---|---|---|---|---|---|
| Flying Chairs | 368 | 496 | 46 | 62 | 8,133,904 | 2,920,448 |
| Things | 400 | 720 | 50 | 90 | 20,250,000 | 4,608,000 |
| Sintel | 368 | 768 | 46 | 96 | 19,501,056 | 4,521,984 |
| KITTI | 288 | 960 | 36 | 120 | 18,662,400 | 4,423,680 |
| Mem. (KITTI) | — | — | — | — | 100.00% | 23.70% |
| Pop. Coverage | — | — | — | — | — | |

TABLE 2

| Dataset | Volume H' × W' × H' × W' | Case 2: VS h = 14 w = 38 | Case 3: VS h = 11 w = 25 | Case 4: VS h = 6 w = 18 | Case 5 VS h = 6 w = 12 |
|---|---|---|---|---|---|
| Flying Chairs | 8,133,904 | 1,517,264 | 784,300 | 308,016 | 205,344 |
| Things | 20,250,000 | 2,394,000 | 1,237,500 | 486,000 | 324,000 |
| Sintel | 19,501,056 | 2,349,312 | 1,214,400 | 476,928 | 317,952 |
| KITTI | 18,662,400 | 2,298,240 | 1,188,000 | 466,560 | 311,040 |

TABLE 2-continued

| Dataset | Volume H' × W' × H' × W' | Case 2: VS h = 14 w = 38 | Case 3: VS h = 11 w = 25 | Case 4: VS h = 6 w = 18 | Case 5 VS h = 6 w = 12 |
|---|---|---|---|---|---|
| Mem. (KITTI) | 100.00% | 12.31% | 6.37% | 2.50% | 1.67% |
| Pop. Coverage | — | 97.25% | 97.41% | | |

Table 1 provides example sizes for correlation volumes for four different optical flow datasets Flying Chairs, Flying Things, Sintel, and KITTI 2015 ("KITTI"). The values in the columns of Table 1 labeled H and W represent the height (H) and width (W) of frames within each of the corresponding datasets. For example, frames in the KITTI dataset have a height of 288 pixels and a width of 960 pixels. In some cases, optical flow estimation can be performed on only a sub-portion of a frame to reduce memory and computational requirements for the optical flow operation. The values in columns of Table 1 labeled H' and W' represent ⅛ of the height H and width W of the respective datasets. In some examples, optical flow estimation can be performed on a center crop (e.g., a center portion of the video frame) that has height=H' and width=W'. The values in the column of Table 1 labeled Full Volume represent the size of a correlation volume formed using every pixel of the target frame as the flow search area, such as illustrated in FIG. 4B above. In some implementations, the target frame can also be center cropped to dimensions of H'×W'. As can be understood from the description of FIG. 4B above, the correlation volume size can be equal to H'×W'×H'×W'. In one illustrative example, for the KITTI dataset with cropped source and target images having dimensions 36×120, the resulting correlation volume can include 18,662,400 values. The values in the column of Table 1 labeled Case 1 represent correlation volume sizes for correlation volumes created utilizing flow search areas smaller than the full target frame, such as flow search areas 326 and 328 of FIG. 3A above. The optical flow search areas of Case 1 have height h=32 and width w=32. The resulting correlation volume size for Case 1 can be equal to H'×W'×h×w. For the KITTI dataset, the resulting correlation volume can include 2,298,240 values (e.g., pixel values). As a result, the amount of memory required to store the correlation volume of Case 1 for the KITTI dataset is 23.7% of the correlation volume from the Full Volume column.

Table 2 is a continuation of Table 1. The Dataset and Volume columns of Table 1 are repeated in Table 2 for easy cross-reference between the tables. The values in the columns of Table 2 labeled Case 2, Case 3, Case 4, and Case 5 represent correlation volume sizes for correlation volumes created utilizing flow search areas smaller than the full target frame, such as flow search areas 326 and 328 of FIG. 3A above. Each of the column headings for the four Cases includes respective optical flow search area dimensions, height=h and width=w. The optical flow search area dimensions for each case are smaller than the corresponding dimensions H' and W' of a cropped source frame or target frame. As an example, the values in the Case 1 column represent the size of a volume created from flow search areas with a height=14 and width=38 for each dataset. As shown in the table, the correlation volumes of Case 2, Case 3, Case 4, and Case 5 for the KITTI dataset can require 12.31%, 6.37%, 2.50%, and 1.67% of the memory required for the Full Volume correlation volume. The reduced correlation volume size can also result in a corresponding reduction of computational effort for pair-wise correlation within the correlation volume. In some cases, these memory and computation savings of nearly an order of magnitude can come without a relatively low cost in accuracy. For example, experimental results for Case 2 and Case 3 show that the resulting optical flow maps for the KITTI dataset covered 97.25% and for the Sintel dataset covered 97.41% of the feature correlations when compared to the Full Volume case. This means that less than 3% of the optical flow information was lost as a result of reducing the optical flow search area.

As shown in Table 1 above for the Full Volume case, for each of the W'×H'=N pixel in the source frame, there can be W'×H'=N possible locations within the flow search area of the target frame that are searched to find the location of the pixel in the target frame. As a result, the amount of memory and computational effort required to complete the optical flow estimation is $O(N^2)$. In some examples, as described above, a flow search area that is smaller than the entire target frame can be used to perform optical flow estimation. The flow search area can be a fixed size h×w that does not scale with N, and as a result the amount of memory and computation effort required to complete the optical flow estimation is reduced to $O(N)$. In some cases, the size of the dimensions of the flow search area h and w can be determined based on a statistical model of the optical flow for a particular dataset and/or optical flow task. In one example, the dimensions of the flow search area can be determined based on a cumulative distribution function (CDF) of a dataset. In such cases, the dimensions for the flow search area can be derived based on a selected probability confidence value. For example, the flow search area dimensions can be selected to target a population coverage >95%, a population coverage >97%, a population coverage >99%, or the like. Example CDFs are shown and discussed with respect to FIG. 6A through 6D below.

Figure 5:
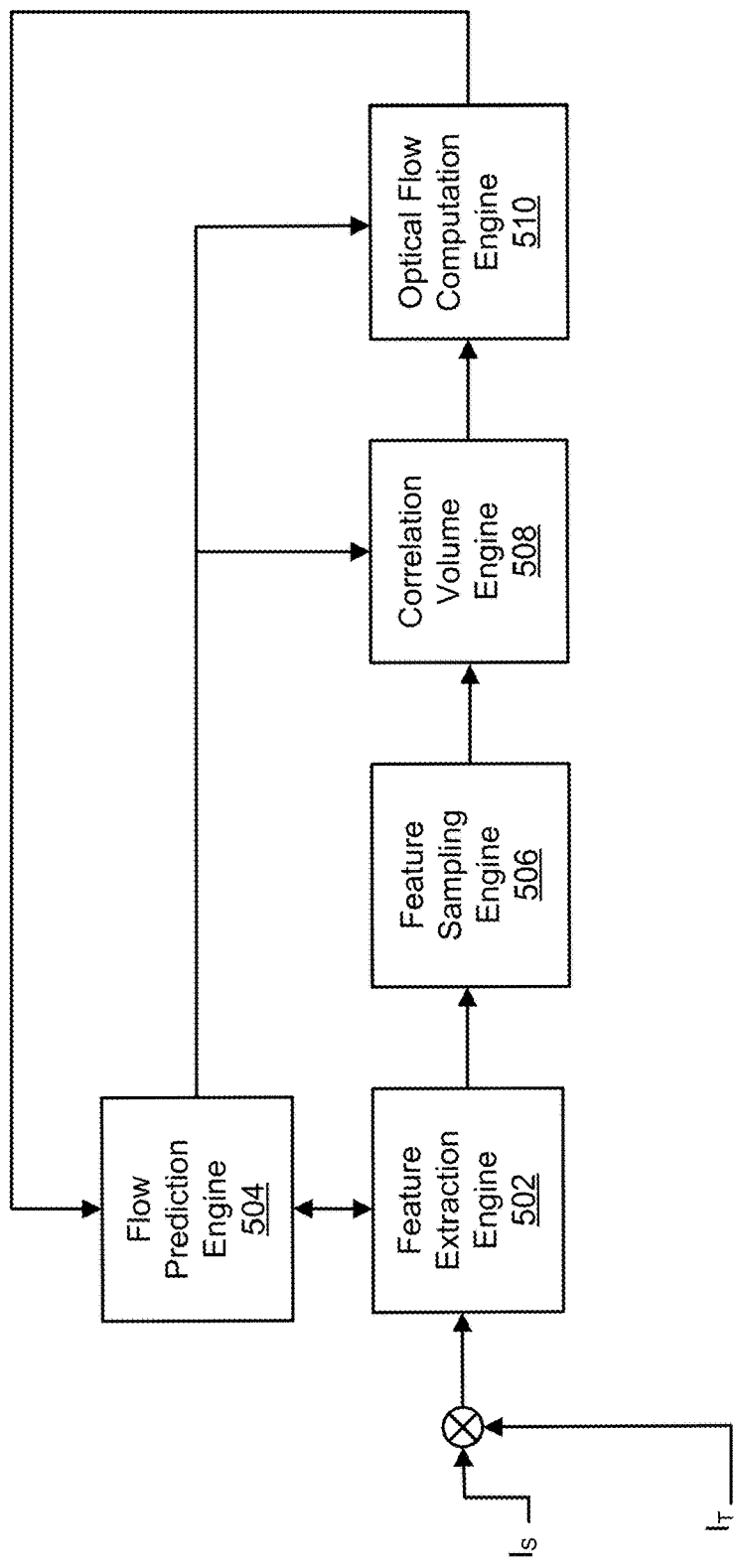
FIG. 5 is a block diagram illustrating an example optical flow estimation system using volumetric sampling, in accordance with some examples.

FIG. 5 is a diagram illustrating an example of an optical flow estimation system 500. In some cases, all or a portion of the optical flow estimation system 500 can correspond to and/or be included within the optical flow estimation system 100 of FIG. 1. For example, the engines of the optical flow estimation system 500 (e.g., a feature extraction engine 502, a flow prediction engine 504, a feature sampling engine 506, a correlation volume engine 508, and an optical flow computation engine 510) may be configured to perform all or a portion of the functions performed by the engines of the optical flow estimation system 100 and/or and any additional functions. As will be explained in more detail below, the optical flow estimation system 500 can perform functions optimized for optical flow estimation using volumetric sampling.

As shown in FIG. 5, the optical flow estimation system 500 can receive a source frame $I_S$ and a target frame $I_T$. In one example, the source frame $I_S$ represents a frame received prior to the target frame $I_T$. For example, the source frame $I_S$ may be directly adjacent to the target frame $I_T$ within a sequence of frames. The source frame $I_S$ and the target frame $I_T$ can be input to a feature extraction engine 502. As shown in FIG. 5, the source frame $I_S$ and the target frame $I_T$ can be concatenated or otherwise combined before being passed to the feature extraction engine 502.

In some examples, the feature extraction engine 502 can determine contextual features associated with the pixels of the source frame $I_S$ and/or the target frame $I_T$. In one example, contextual features associated with a pixel can include feature vectors extracted from a frame using a machine learning system and/or algorithm. An example of a machine learning system and/or algorithm that can be used is a deep neural network trained for feature extraction. Illustrative examples of deep neural networks are described below with respect to FIG. 9 and FIG. 10. The feature vectors can indicate features such as a label or classification of the pixel, visual properties and/or characteristics of the pixel, semantic features of the pixel, among other features.

In some cases, the feature vectors can include information relevant to spatial characteristics of a pixel. The spatial characteristics can include associations of the pixel with object boundaries, a smoothness of the pixel, discontinuities associated with the pixel, among other characteristics. In some cases, the spatial characteristics can include a spatial confidence associated with the significance and/or relevance of the pixel to overall optical flow estimation. For example, a pixel with a high spatial confidence may be highly significant and/or relevant (e.g., a high amount of movement) to optical flow estimation. In some cases, the feature vectors can include information relevant to temporal characteristics of the pixel. In some cases, the temporal characteristics of the pixel can include one or more characteristics associated with the motion of the pixel, including the velocity of the motion, the acceleration of the motion, among other characteristics. In one example, the temporal characteristics can include a confidence associated with the significance and/or relevance of the motion of the pixel to overall optical flow estimation. For example, a pixel with a high temporal confidence may be highly significant and/or relevant to optical flow estimation.

In some cases, the feature extraction engine 502 can determine multi-scale contextual features associated with a frame. Multi-scale contextual features can include features associated with a frame at various scales (e.g., resolutions). For example, the feature extraction engine 502 can determine contextual features associated with a high-scale (e.g., full resolution) version of a frame. Additionally or alternatively, the feature extraction engine 502 can determine contextual features associated with one or more lower-scale (e.g., reduced resolution) versions of a frame. In some cases, contextual features associated with different scales can be utilized at different steps of the optical flow estimation process. For example, utilizing low-scale feature vectors can improve the efficiency of some optical flow estimation steps, while utilizing high-scale feature vectors can improve the quality and/or accuracy of other optical flow estimation steps.

In some cases, contextual features associated with a pixel can include contextual features associated with pixels surrounding and/or nearby the pixel, as noted above. For instance, each pixel of a frame can represent a center pixel that is surrounded by one or more neighbor pixels. In one example, a neighbor pixel can refer to any pixel that is directly adjacent (e.g., horizontally, vertically, and/or diagonally adjacent) to the center pixel. In other examples, a neighbor pixel can refer to a pixel that is separated from the center pixel by no more than a threshold distance or number of pixels (e.g., 2 pixels, 3 pixels, etc.). In further examples, a neighbor pixel may be a pixel that has a high spatial and/or temporal association with the pixel. These pixels may be adjacent to the center pixel, or non-adjacent (e.g., non-local) to the center pixel. The feature extraction engine 502 can determine contextual features of any number of neighbor pixels associated with a center pixel. For example, feature extraction engine 502 can extract and collect as many contextual features as needed for one or more steps of optical flow estimation processing (explained in more detail below). The feature sampling engine 506 can also associate the contextual features of the neighbor pixels with the center pixel. For example, the feature extraction engine 502 can concatenate, group, and/or otherwise store the contextual features of the neighbor pixels in connection with the contextual features of the center pixel within a data structure associated with the center pixel. The data structure can include an index corresponding to the coordinates of the center pixel. In one example, the feature extraction engine 502 can fuse contextual features associated with each relevant neighbor pixel through weighting, summation, concatenation, and/or other technique. For instance, the feature extraction engine 502 can determine the fused contextual features according to the equation $f_{p,i}$, $i \in \{0,1, \ldots, C-1\}$, $C \in R$, such that features $f_{p,i}$ are derived for pixel p, where C denotes a number of channels.

Associating contextual features of neighbor pixels with contextual features of a center pixel can improve the accuracy of optical flow estimation. For instance, determining and storing the contextual features of neighbor pixels in connection with a center pixel can help the optical flow estimation system 500 accurately identify a pixel that corresponds to the center pixel within a subsequent frame. The contextual information associated with neighbor pixels can help the optical flow estimation system 500 accurately select a corresponding pixel from within multiple candidate pixels.

Flow prediction engine 504 can provide initial flow estimation values from a flow target map (e.g., flow target map 316 of FIG. 3A). In some cases, flow prediction engine 504 can also include dimensions of flow search areas that can be utilized by the correlation volume engine 508 below. In some cases, the flow prediction engine can also supply supplemental history data, such as supplemental history data 112 of FIG. 1 above. The supplemental history data may be combined with features generated by the feature extraction engine 502 to perform sequential flow consistency calculations as described above. For example, if the flow prediction engine 504 includes supplemental history data about the trajectory of a ball, then features extracted by feature extraction engine 502 related to the ball in the source frame can be combined with the supplemental history information to provide an initial estimated position of the ball in the target frame.

In some cases, the feature sampling engine 506 can receive features (e.g., represented by one or more feature vectors) extracted by the feature extraction engine 502. The feature sampling engine 506 can perform the operation of sampling and/or re-grouping of the sampled points of the features. For example, the feature sampling engine 506 can retrieve and/or group feature vectors (or sample points of features in the feature vectors) to facilitate subsequent stages of processing.

The correlation volume engine 508 can receive the sampled feature vectors from the feature sampling engine 506. The correlation volume engine 508 can perform correlation volume computation on the sampled feature vectors. For instance, using the output of sampled feature maps from both input frames (the source frame $I_S$ and the flow search areas within the target frame $I_T$) as input, the correlation volume engine 508 can compute pair-wise correlation in a number of pair combinations (e.g., for all possible pair combinations). Each correlation quantity denotes the correlation or in some cases the similarity between two features, one from each frame (e.g., one feature from the source frame $I_S$ and one feature from the target frame $I_T$). The correlation volume determined by the correlation volume engine 508 can be used as the input to subsequent optical flow estimation (e.g., by the optical flow computation engine 510). In one illustrative example, the pixel collections (e.g., tensors including the data) can have a dimension or shape of $H_sW_sC$ and $h_tw_tC$, respectively, where H denotes height of the source feature map, W denotes width of the source feature map, h denotes height of the optical flow search areas within the target frame, w denotes width of the optical flow search areas within the target frame, and C denotes a number of channels (or depth in some cases) in a neural network used for the optical flow estimation system 500. In some examples, the correlation volume engine 508 can compute the correlation volume using the following equation: $f_s \cdot f_t = \sum_{i=0}^{C-1} f_{s,i} f_{t,i}$, where $f_s$, $f_t \in R^C$ are features of individual pixels in the pixel collections for the source frame $I_S$ and the target frame $I_T$, respectively.

The optical flow computation engine 510 can receive the correlation volume computation (e.g., the computed correlation volume) from the correlation volume engine 508. The optical flow computation engine 510 can use the features in the correlation volume computation to perform pointwise (e.g., pixel-wise) optical flow estimations. In some cases, the optical flow computation engine 510 can use one or more neural network operations (e.g., one or more layers of convolutions, one or more residual blocks of convolutions, and/or other network operations) to refine and/or adjust the optical flow estimations. For example, the optical flow computation engine 510 can determine optical flow estimations for particular feature vectors. In one example, the optical flow computation engine 510 can perform optical flow estimation to determine optical flow vectors for pixels or regions of pixels. In some examples, the features corresponding to the source frame $I_S$ and the target frame $I_T$ can have a same resolution as the source frame $I_S$ and the target frame $I_T$.

The optical flow $F_f$ calculated by the optical flow computation engine 510 can be calculated according to the equation below:

$$F_f = F_{f,T} + \sum_{i=0}^{N-1} \Delta F_{f,i}$$

Where Ff, T is an initial flow target map (e.g., as provided by flow prediction engine 504) and $\Delta F_{f,i}$ are iterative adjustments to the values of the flow target vector generated during iterations of optical flow estimation. For example, iterative optical flow estimation may be performed where the optical flow estimation system includes a recurrent neural network (RNN) or utilizes any iterative estimation technique. In such iterative cases, the value for the optical flow targets in the optical flow map can be updated by small increments per iteration until they converge to a final value. For example, in an optical flow estimation system with three iterations (e.g., N=3), the value for $F_f$ can be:

$F_f = F_{f,T} + \Delta F_{f,0} + \Delta F_{f,1} + \Delta F_{f,2}$

In some cases, optical flow computation engine 510 may only perform a single iteration, in which case the initial flow target vector will only be updated by a single value $\Delta F_{f,0}$.

As mentioned above, the feature extraction engine 502 can determine multi-scale contextual features associated with pixels of a frame. In some cases, various steps of the optical flow estimation process can utilize contextual features of different scales. For example, the optical flow computation engine 510 can utilize extracted features in the form of a feature pyramid of multiple scales, of concatenated and/or fused features with one or multiple scales, or other combinations of features.

In some examples, the optical flow computation engine 510 can take the most recent pixel-level or patch-level (e.g., for a pixel and associated neighbor pixels) flow (or displacement) estimates to look up for the corresponding correlation metrics along with a suitable neighborhood context (e.g., association with neighboring pixels) in the correlation volume. In such an example, the looked up metrics can be further fed into a feed-forward recurrent neural subnet or convolution/filtering layer(s) to estimate and update the new per-pixel or per-patch flow or displacements.

FIG. 6A and FIG. 6B illustrate example cumulative distribution functions for a first example video dataset that can be used to determine a shape and/or size of flow search area used by the optical flow estimation system 100 of FIG. 1. The CDF 602 of FIG. 6A illustrates a CDF of optical flow vector components in the width dimension (e.g., movement left and right) of the first dataset. The CDF 602 of FIG. 6A can be obtained by performing optical flow estimation using an optical flow estimation such as optical flow estimation system 100 and plotting the resulting width dimension component of the optical flow estimation values. The y-axis value of the cumulative distribution function represents the percentage of values of optical flow vector components in the width dimension that have a value less than the corresponding x-axis value of the plot. As illustrated in FIG. 6A, approximately 98% percent (e.g., between the $1^{st}$ and $99^{th}$ percentile) of the optical flow values in the width dimension for the first dataset fall between −10 and 15. In some cases, knowledge of the characteristics of the CDF of the first dataset can be used to set the width for a flow search area for optical flow estimation by the optical flow estimation system. In one illustrative example, the width w of the flow search area used for optical flow estimation can be set to 25 to correspond with the range of −10 to 15 illustrated in FIG. 6A.

FIG. 6B illustrates the CDF 604 of optical flow vector components in the height dimension (e.g., movement up and down) for the first dataset. The CDF 604 of FIG. 6B can be obtained by performing an optical flow estimation, such as an optical flow estimation performed by optical flow estimation system 100, and plotting the resulting height dimension component of the resulting optical flow values. As illustrated in FIG. 6B, approximately 98% (e.g., between the $1^{st}$ and $99^{th}$ percentile) of the optical flow values in the height dimension for the first dataset fall between −5 and 6. In one illustrative example, the width w of the flow search area used for optical flow estimation can be set to 11 to correspond with the range of −5 to 6 illustrated in FIG. 6B. As shown in FIG. 6B, the optical flow values in the height dimension are skewed to having larger positive values than negative values.

The illustrative example width of 25 pixels and height of 11 pixels of the flow search area as described for FIG. 6A and FIG. 6B corresponds to Case 3 described above with respect to Table 2. The illustrative values are derived based on an experimental CDF obtained from the Sintel dataset.

Figures 6C, 6D:
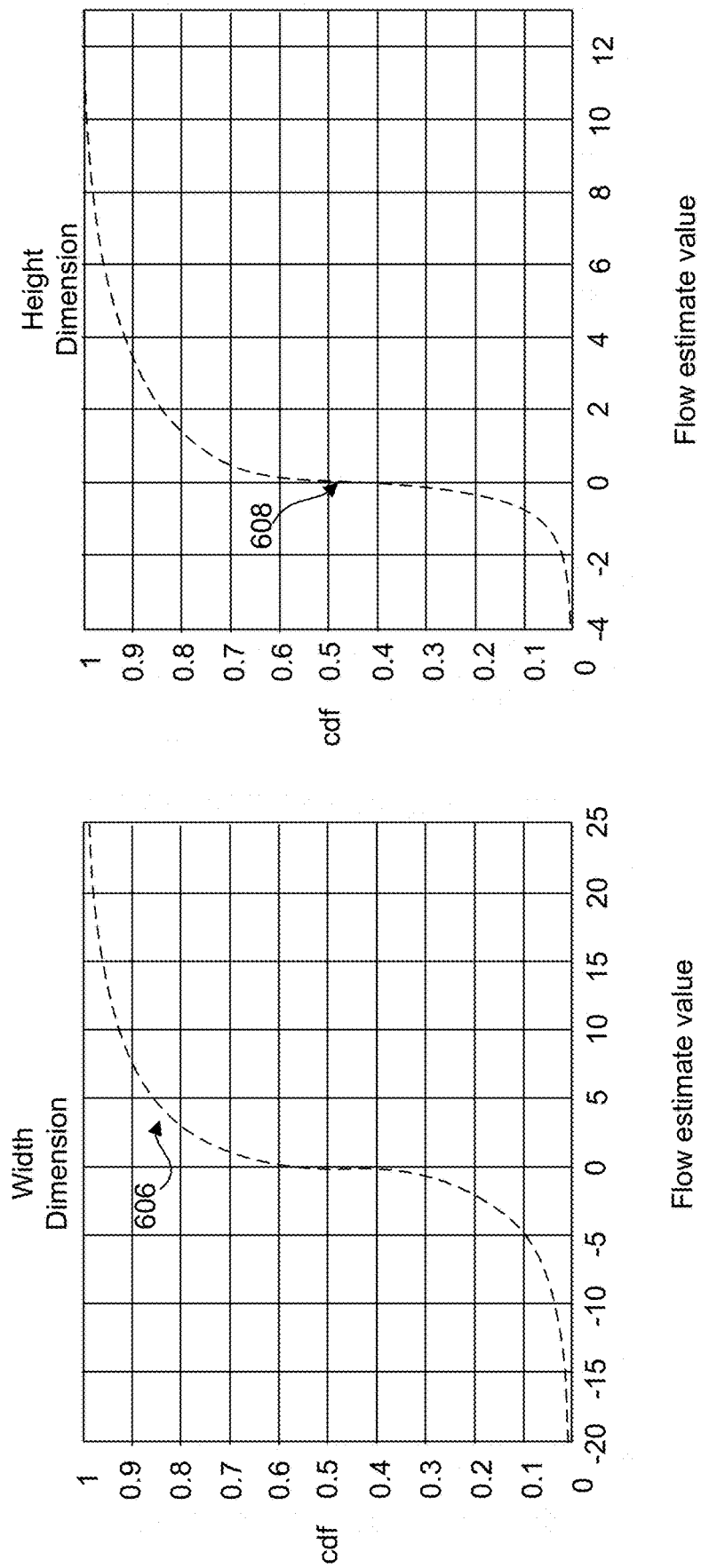

FIG. 6C illustrates the CDF 606 of a second dataset in the width dimension. As illustrated in FIG. 6C, approximately 98% percent (e.g., between the 1$^{st}$ and 99$^{th}$ percentile) of the optical flow values in the width dimension for the first dataset fall between −16 and 22. In one illustrative example, the width w of the flow search area used for optical flow estimation can be set to 38 to correspond with the range of −16 to 22 illustrated in FIG. 6C.

FIG. 6D illustrates the CDF 608 of the second dataset in the height dimension. As illustrated in FIG. 6D, approximately 98% (e.g., between the 1$^{st}$ and 99$^{th}$ percentile) of the optical flow values in the height dimension for the first dataset fall between −4 and 10. In one illustrative example, the width w of the flow search area used for optical flow estimation can be set to 14 to correspond with the range of −4 to 10 illustrated in FIG. 6D.

The illustrative example width of 38 pixels and height of 14 pixels of the flow search area as described for FIG. 6C and FIG. 6D corresponds to Case 2 described above with respect to Table 2. The illustrative values are derived based on an experimental CDF obtained from the KITTI dataset.

FIG. 7A, FIG. 7B, FIG. 7C, and FIG. 7D are diagrams illustrating examples optical flow search areas and that may be used by the optical flow estimation system 100 of FIG. 1. As shown in FIG. 7A, FIG. 7B, FIG. 7C, and FIG. 7D, a first pixel location 702A in a source frame 701 of a sequence of frames can have a corresponding pixel location 702B in a target frame 703 of the sequence of frames. In the illustrated examples, the source frame 701 and the target frame 703 each have a height of H pixels and a width of W pixels. Once the corresponding pixel location 702B is found within the search area, an optical flow vector can be produced by determining the amount of movement of the pixel as described above with regard to FIG. 2.

Figure 7A:
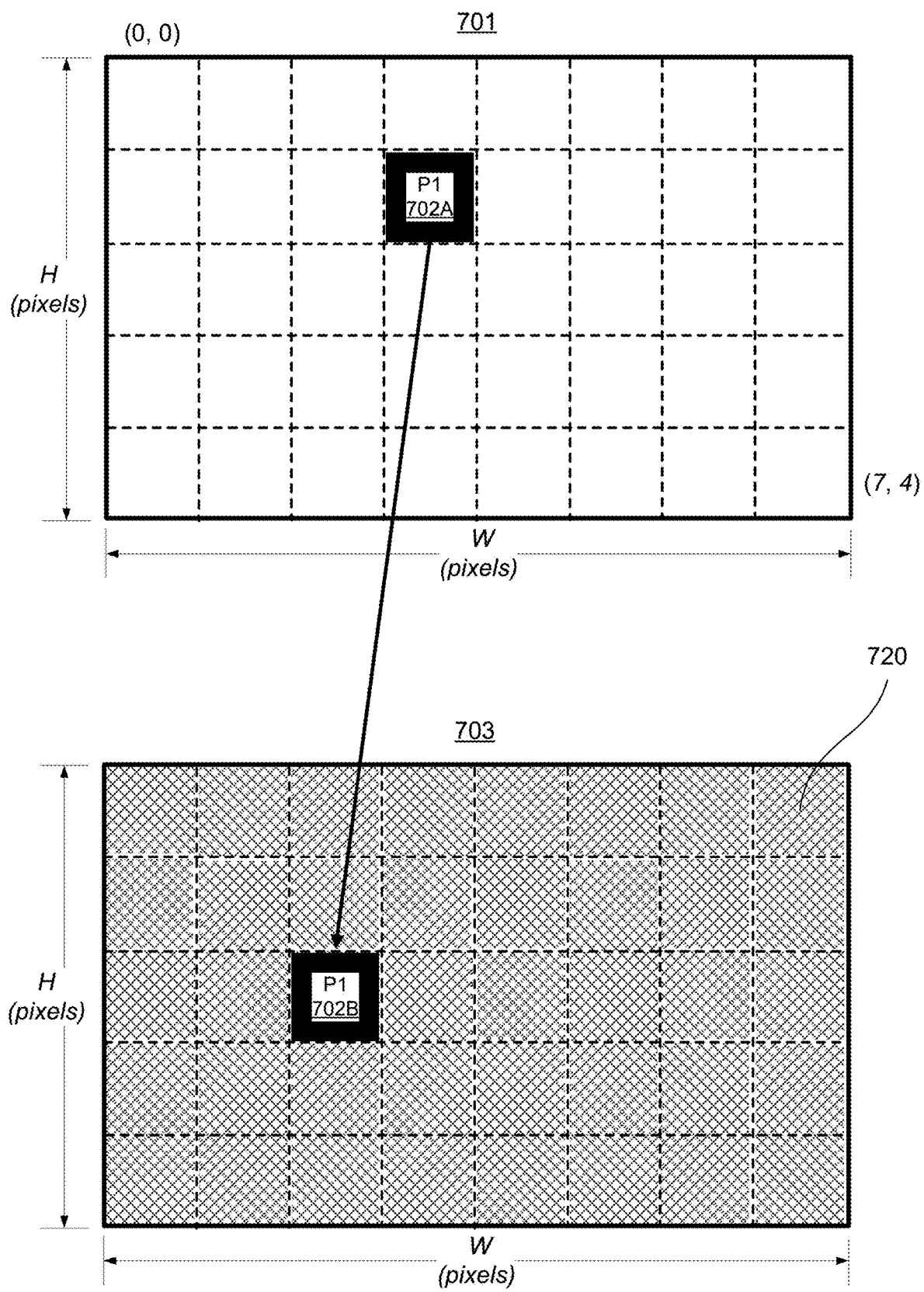
FIG. 7A, FIG. 7B, FIG. 7C, and FIG. 7D are illustrations of example optical flow search area shapes and initial estimated pixel positions, in accordance with some examples.

FIG. 7A illustrates an example of a flow search area 720 that includes every pixel of the target frame to be searched. As described above, the optical flow estimation system (e.g., optical flow estimation system 100) can search for each pixel of the source frame 701 within the target frame 703 to generate an optical flow map. In the illustrated example of FIG. 7A, the flow search area 720 includes W×H total search locations equal to the number of pixels in the target frame 703. As described above, utilizing a full frame as a flow search area can incur significant costs in both memory and computational effort. For example, performing a point-to-point correlation within a correlation volume based on a full frame search of the target frame can scale in computational and memory cost with O(N$^2$).

Figure 7B:
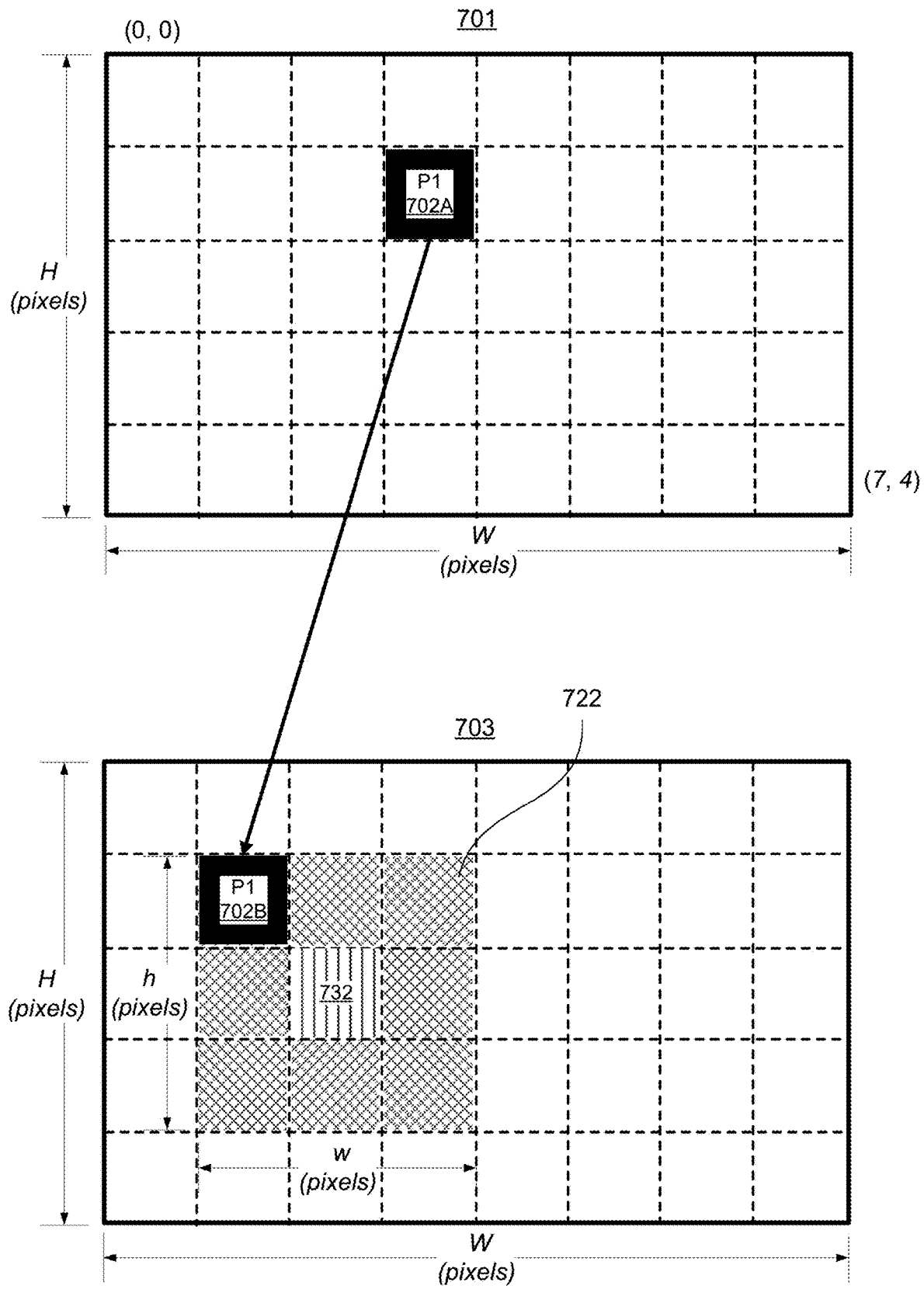

FIG. 7B illustrates an example of a flow search area 722 that is square with a width and height of three pixels and centered around the initial flow target 732 in the target frame 703. In some cases, a square flow search area 722 can be used when the dataset has a symmetric CDF in both the width dimension and height dimension. In some examples, a symmetric flow search area 722 can be used when the characteristics of the video data to be analyzed by the optical flow estimation system is not available and there is no basis for preferentially searching in one direction over another. In some aspects, the width and height of a square flow search area 722 can be varied depending on the characteristics of the video data being analyzed (e.g., characteristics of the CDF). In addition, in some aspects, the width and height of the square flow search area 722 can be varied depending on whether there is optical flow history information available for use by the optical for estimation system. For example, when there is no optical flow history information available, a larger flow search area may be required. In contrast, when one or more frames of optical flow history is available, a smaller flower search area may be used. In one illustrative example, an optical flow estimation system can use a 32×32-pixel square flow search area 722 when no optical flow history is available and a 16×16-pixel square flow search area when one or more frames of optical flow history is available.

Figure 7C:
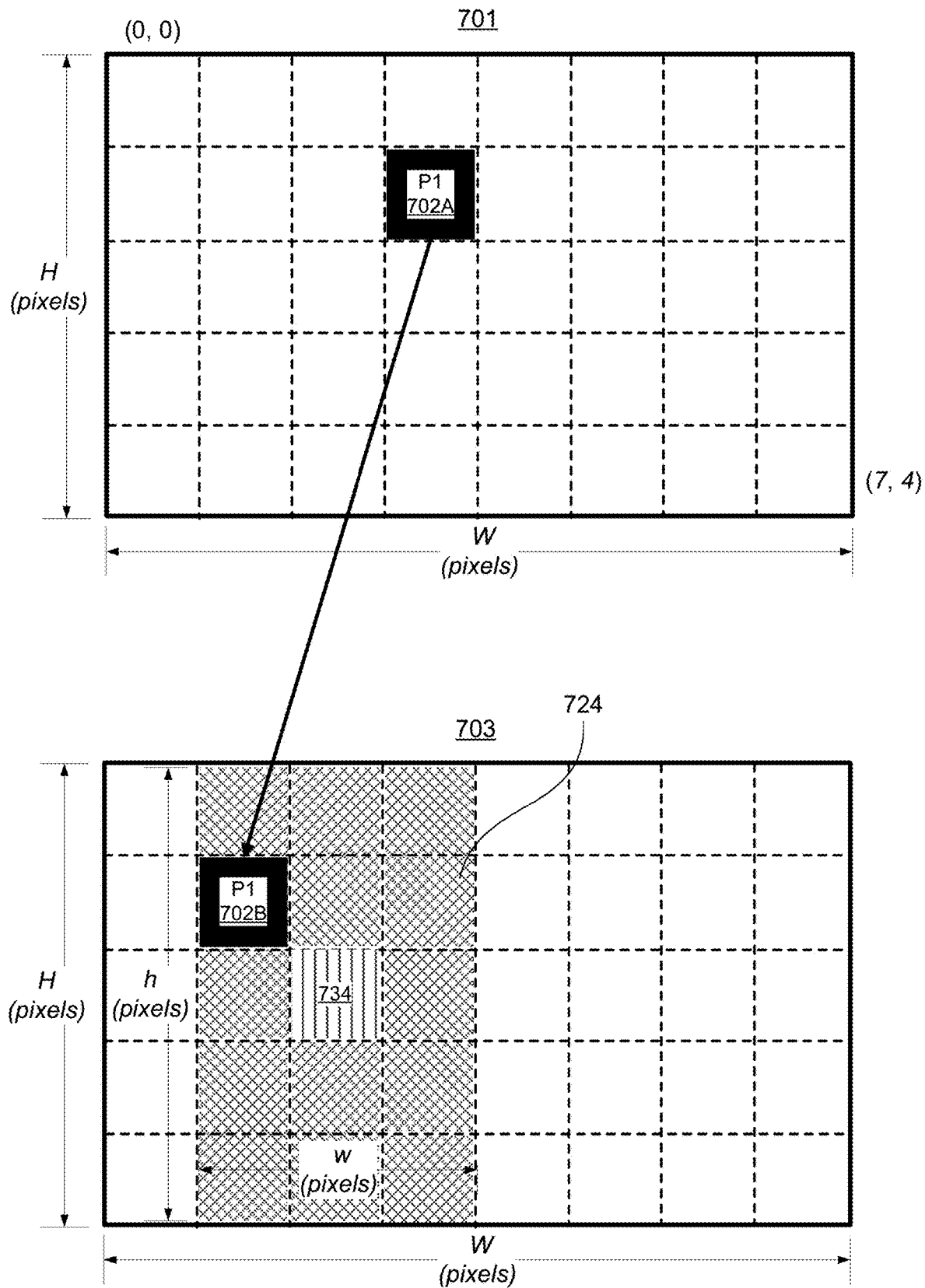

FIG. 7C illustrates an example optical flow search area 724 that is rectangular with a width of three pixels and a height of five pixels, and an initial flow estimate 734 that is centered in both the width dimension and height dimension. In some cases, a rectangular optical flow-search area can be utilized when the video dataset being processed by the optical flow-estimation system has a greater variance in optical flow values in one dimension when compared to the other. For example, in the illustrated optical flow search area 724 can be used when the height and width of the CDF are close to symmetrical, such as the CDFs 602 and 604 illustrated in FIG. 6A and FIG. 6B above.

Figure 7D:
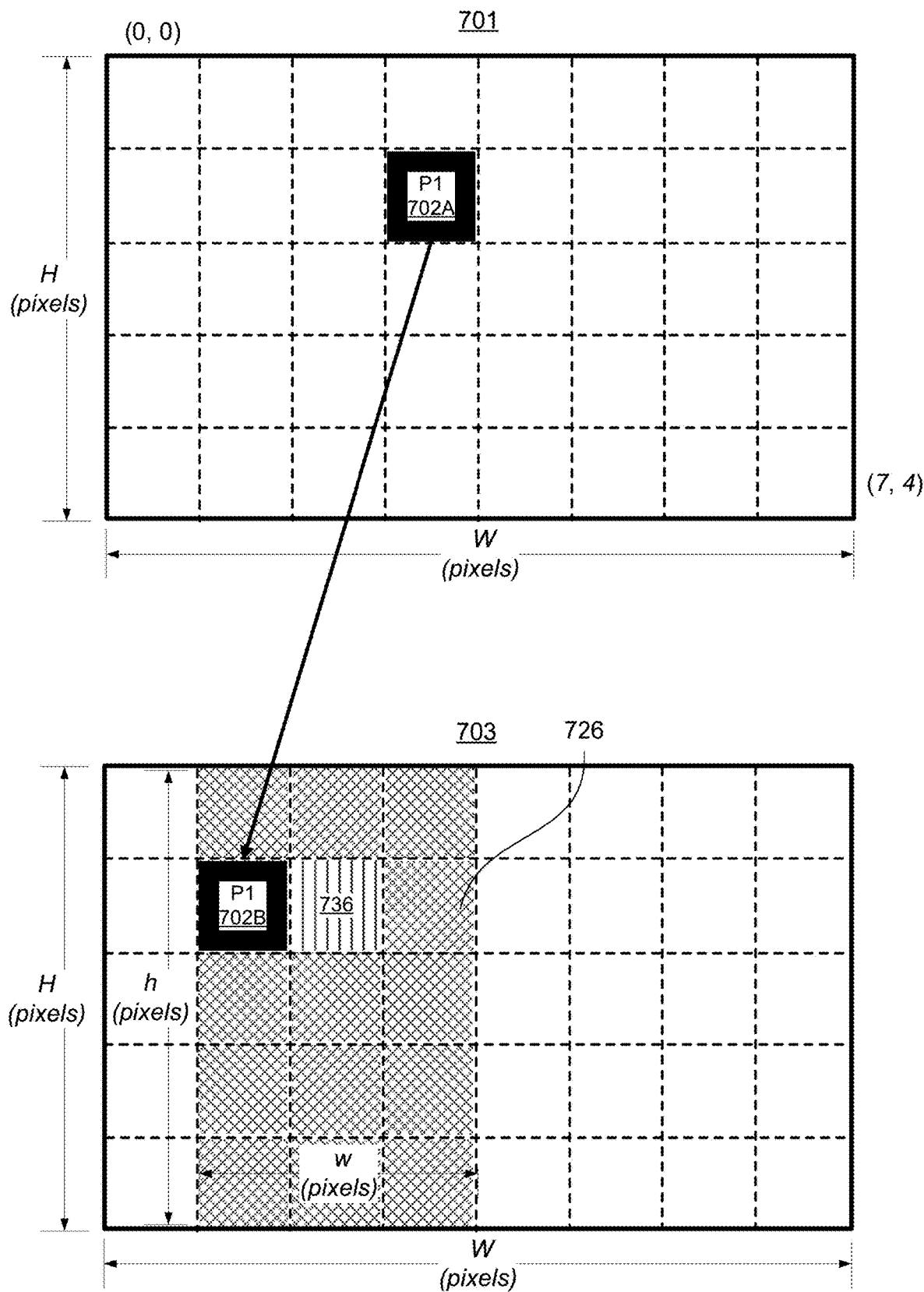

FIG. 7D illustrates an example optical flow search area 726 that has the same shape as the optical flow search area 724, but has an initial flow estimate 736 that is not centered within the flow search area. In some aspects, the optical flow search area 726 can be utilized when the video dataset being processed has a greater distribution in one direction in the width and/or height dimension compared to the other. For example, the flow search area 726 could correspond to the CDF 608 shown in FIG. 6D, which has a distribution skewed toward positive values in the height dimension that can correspond to downward movement. FIG. 7D shows one row of pixels above the initial flow estimate 736 and three rows below the initial flow estimate. Accordingly, the optical flow search area 726 can also include more pixels below the initial flow estimate 736 than above the initial flow estimate.

The systems and techniques described provide volumetric sampling using a subset of pixels and/or features from a target frame in a flow search area to generate a correlation volume as opposed to performing correlation using a correlation volume based on all of the pixels of the target frame. Such a solution can benefit optical flow estimation performed on devices that have limited computational and memory resources, in particular low-latency memory such as TCM. In some cases, the optical flow estimation can also utilize a flow target map for providing initial estimated positions of pixels and/or features in a target frame. In some cases, the flow target map can be based on a single previous optical flow estimate and in some cases the flow target map can be based on multiple previous optical flow estimates.

By determining a flow search area that is smaller than the size of the full target frame but does not significantly degrade accuracy of optical flow estimation, the optical flow estimation system (e.g., optical flow estimation system 100 and optical flow estimation system 500) can scale with the size of the input frame according to O(N) rather than O(N$^2$). The size of the flow search areas can be determined based on characteristics of the data being analyzed by the optical flow estimation system in combination with the amount of optical flow history information available and the confidence that the optical flow history information applies to the current frame being processed by the optical flow estimation systems. The disclosed optical flow estimation systems can optimize optical flow estimation using volumetric sampling for any combination of available optical flow map information (e.g., whether there is information from a single previous frame or multiple previous frames), supplemental history information (e.g., feature information extracted from previous frames), and/or information about characteristics of the data (e.g., a CDF of a representative dataset for the optical flow estimation problem to be solved).

Figure 8:
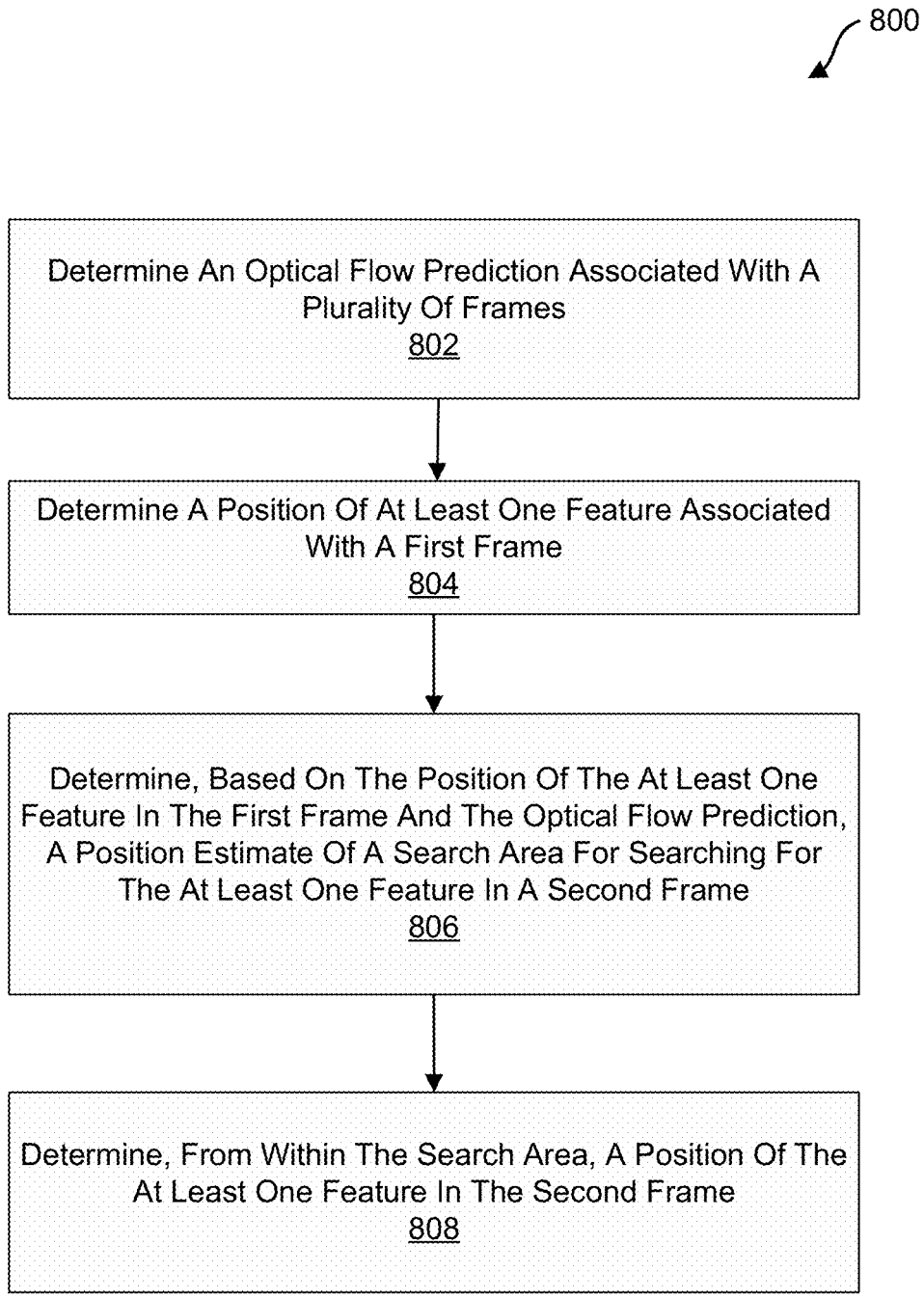
FIG. 8 is a flow diagram illustrating an example of a process for performing optical flow estimation, in accordance with some examples.

FIG. 8 is a flowchart illustrating an example of a process 800 of optical flow estimation between one or more frames using one or more of the techniques described herein. At block 802, the process 800 includes determining an optical flow prediction associated with a plurality of frames. In one illustrative example, determining the optical flow prediction associated with the plurality of frames includes performing functionality described with respect to flow target engine 102 shown in FIG. 1. In some cases, the optical flow prediction comprises a flow target map. In some cases, the flow target map can contain optical flow history information of a previous frame.

At block 804, the process 800 includes determining a position of at least one feature associated with a first frame. In some cases, the first frame can precede a second frame in a frame sequence. For example, in some cases, the process 800 can include performing object detection on the at least one feature to determine an object type associated with the at least one feature. For example, the process 800 can determine that the at least one feature is associated with an object, a vehicle, a person, a road sign, a road, among others. The process 800 can determine the optical flow prediction based on the object type associated with the at least one feature. In one illustrative example, determining the object type associated with the at least one feature includes performing functionality described with respect to feature extraction engine 502 and/or feature sampling engine 506 shown in FIG. 5. In some cases, the process 800 can determine the optical flow prediction based on the object type associated with the at least one feature. In some cases, the at least one feature associated with the first frame comprises a pixel location of at least a portion of an object in the first frame. In some cases, the at least one feature associated with the first frame comprises a pixel location of at least a portion of an object in the first frame.

At block 806, the process 800 includes determining, based on the position of the at least one feature in the first frame and the optical flow prediction, a position estimate of a search area for searching for the at least one feature in a second frame. For example, in some cases, the process 800 can utilize optical flow history to determine an initial estimated position for the at least one feature in the second frame. In some cases, the process 800 can include utilizing supplemental history data to determine the position estimate of the search area. In some cases, the process 800 includes determining the optical flow prediction comprises obtaining an optical flow vector corresponding the pixel location of at least the portion of an object in the first frame. As noted above, the first frame can precede the second frame in the frame sequence.

In some cases, the optical flow prediction corresponding to the at least one feature is based on at least a third frame, wherein the third frame precedes the first frame and the second frame in a frame sequence. In some cases, the third frame may be a single frame immediately preceding the first frame and the second frame. In some cases, the optical flow prediction can be based on an optical flow map determined based on at least the third frame. In some cases, the third frame can be included in a sequence of frames preceding the first frame and the second frame. In some cases, the optical flow prediction can include optical flow history information based on the third frame and one or more additional frames of the sequence of frames preceding the first frame and the second frame.

At block 808, the process 800 includes determining, from within the search area, a position of the at least one feature in the second frame. For example, in some cases, determining the position of the at least one feature in the second frame can include generating a correlation volume. In one illustrative example, generating a correlation volume includes performing the functionality described with respect to correlation volume engine 508 shown in FIG. 5. In some cases, the process 800 can perform an optical flow computation to determine the position of the at least one feature in the second frame. In one illustrative example, the optical flow computation can include the functionality described with respect to optical flow computation engine 510 shown in FIG. 5. In some cases, the search area includes at least an estimated pixel position of the at least one feature in the second frame. The estimated pixel position can be centered within the search area or can be off-center with respect to the search area. In some cases, the search area comprises a rectangle having a height and a width, wherein the height and width are different.

In some examples, process 800 includes determining the position estimate of the search area comprises offsetting the position of the at least one feature associated with the first frame by an optical flow prediction value of the optical flow prediction associated with the at least one feature. In some cases, process 800 can include determining the optical flow prediction comprises obtaining an optical flow vector corresponding the pixel location of at least a portion of an object. In some examples, the first frame can include a plurality of features and process 800 can include determining corresponding estimated positions of the plurality of features in the second frame.

In some examples, the processes described herein (e.g., process 800 and/or other process described herein) may be performed by a computing device or apparatus, such as a computing device having the computing device architecture of computing system 1100 shown in FIG. 1. In one example, the process 800 can be performed by a computing device with the computing device architecture of computing system 1100 implementing the optical flow estimation system 100 shown in FIG. 1. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 800.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 800 and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, the optical flow estimation systems and techniques described herein can be implemented using a neural network-based machine learning system. Illustrative examples of neural networks that can be used include one or more convolutional neural networks (CNNs), autoencoders, deep belief nets (DBNs), Recurrent Neural Networks (RNNs), Generative Adversarial Networks (GANs), Gated Recurrent Unit (GRUs), any combination thereof, and/or any other suitable neural network.

Figure 9:
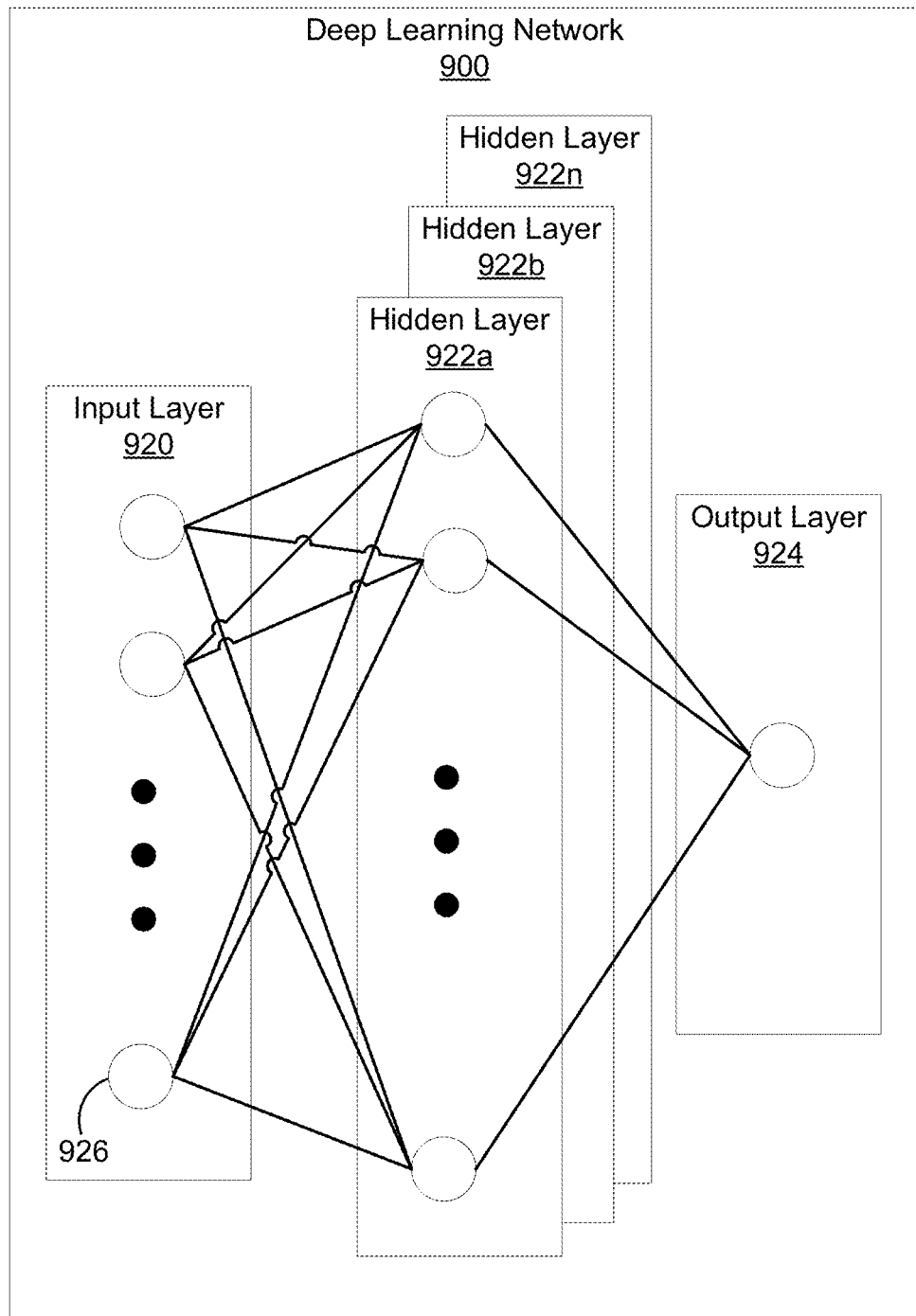
FIG. 9 is a diagram illustrating an example of deep learning neural network, in accordance with some examples.

FIG. 9 is an illustrative example of a deep learning neural network 900 that can be used by an optical flow estimation system. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to the information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and 11 denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
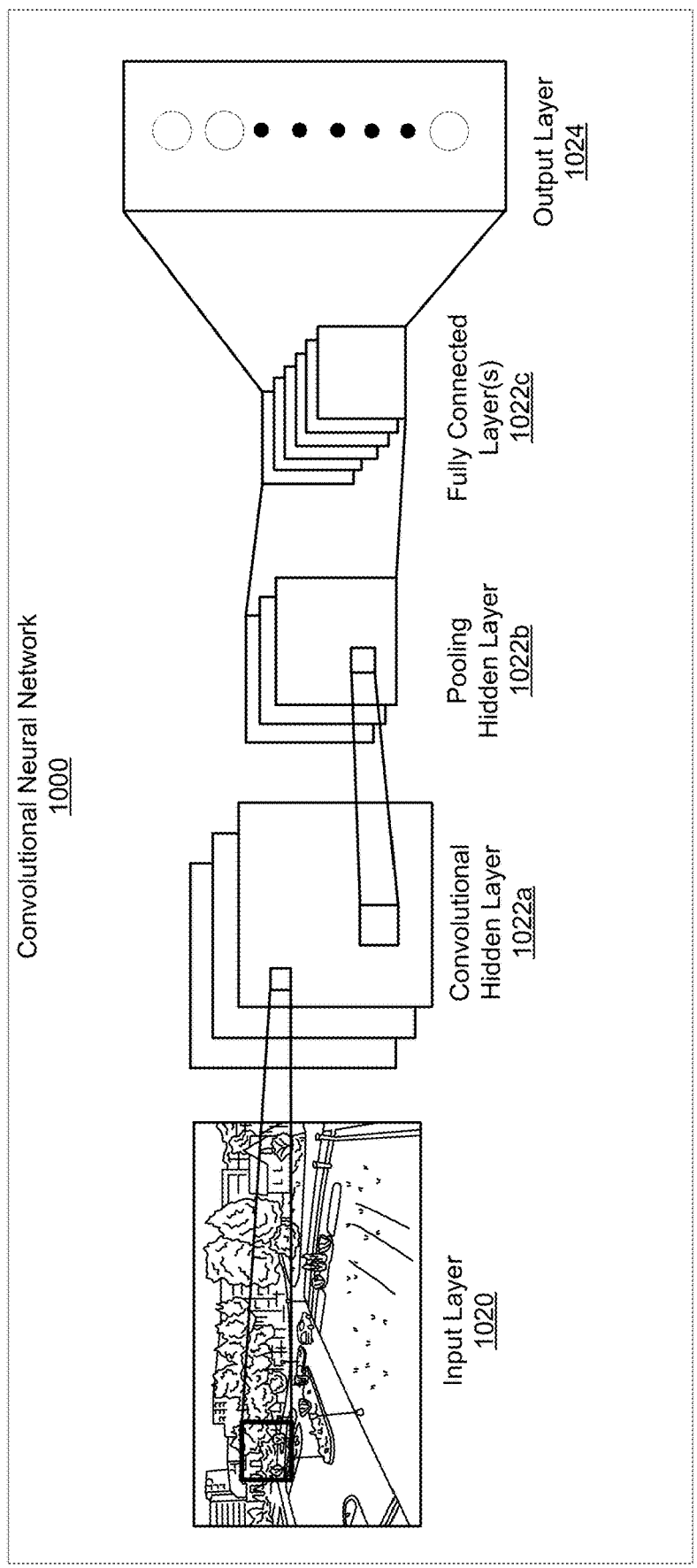
FIG. 10 is a diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
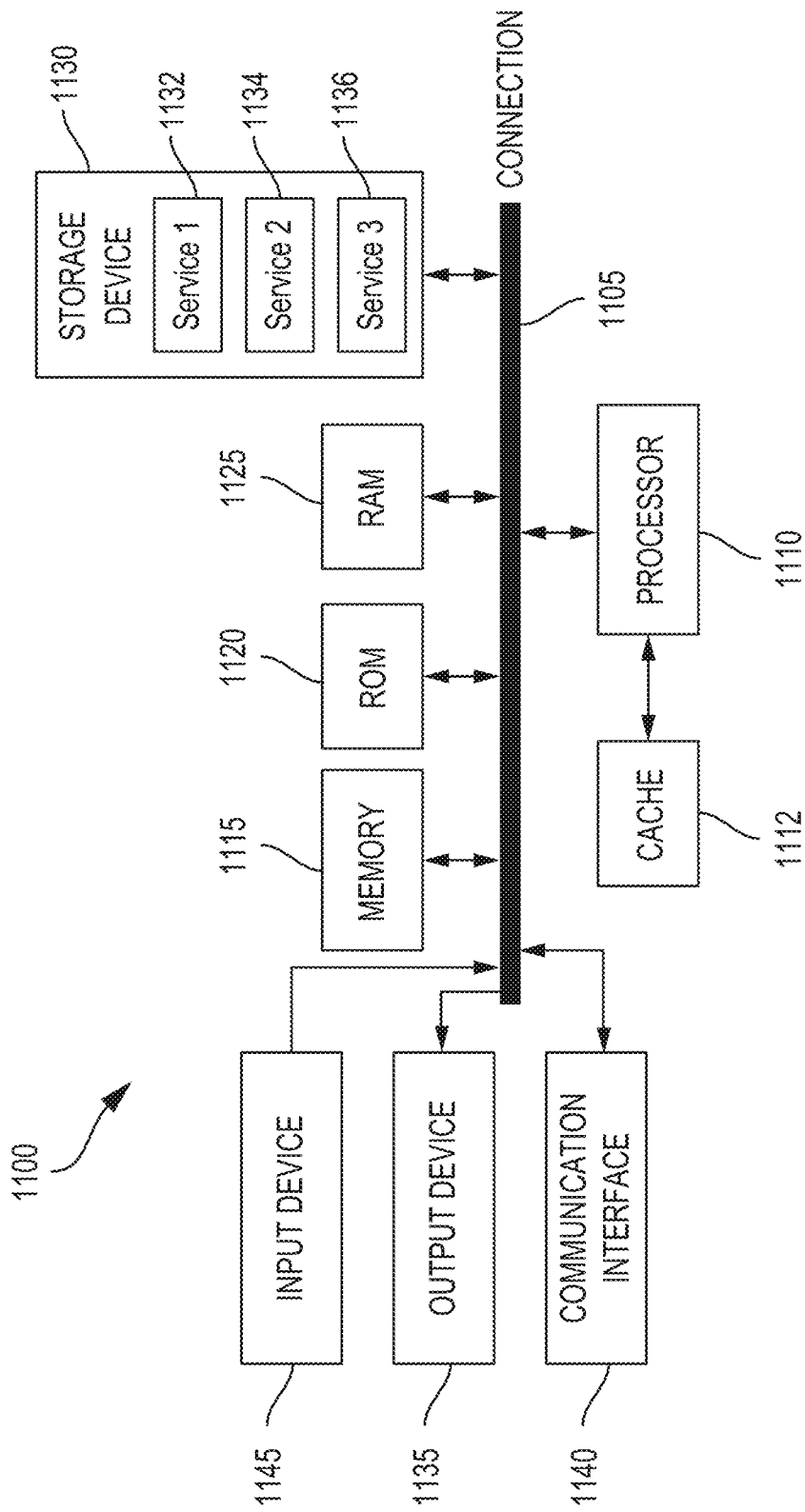
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

In some aspects, computing system 1100 includes means for performing operations described herein. The means can include one or more of the components of the system 1100. For example, the means for performing operations described herein may include the processor(s) 1110, connection(s) 1105, system memory(ies) 1115, ROM(s) 1120, and/or RAM(s) 1125.

In some aspects, system 1100 can include: means for determining an optical flow prediction associated with a plurality of frames; determining a position of at least one feature associated with a first frame; determining, based on the position of the at least one feature in the first frame and the optical flow prediction, a position estimate of a search area for searching for the at least one feature in a second frame; and determining, from within the search area, a position of the at least one feature in the second frame. In some examples, the means for determining can include, processor(s) 1110, system memory(ies) 1115, ROM(s) 1120, and/or RAM(s) 1125, any combination thereof, or other components of the system 1100.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method of optical flow estimation of one or more frames, the method comprising: determining an optical flow prediction associated with a plurality of frames; determining a position of at least one feature associated with a first frame; determining, based on the position of the at least one feature in the first frame and the optical flow prediction, a position estimate of a search area for searching for the at least one feature in a second frame; and determining, from within the search area, a position of the at least one feature in the second frame.

Aspect 2: The method of aspect 1, wherein determining the position estimate of the search area comprises offsetting the position of the at least one feature associated with the first frame by an optical flow prediction value of the optical flow prediction associated with the at least one feature.

Aspect 3: The method of aspect 2, wherein the optical flow prediction value associated with the at least one feature is determined based at least in part on the position of a pixel associated with the at least one feature in the first frame.

Aspect 4: The method of any one of aspects 1 to 3, further comprising: performing object detection on the at least one feature to determine an object type associated with the at least one feature; and determining the optical flow prediction based on the object type associated with the at least one feature.

Aspect 5: The method of any one of aspects 1 to 4; wherein a plurality of features associated with the first frame comprises respective features corresponding to pixels of the first frame.

Aspect 6: The method of any one of aspects 1 to 5; wherein the at least one feature associated with the first frame comprises a pixel location of at least a portion of an object in the first frame.

Aspect 7: The method of aspect 6, wherein determining the optical flow prediction comprises obtaining an optical flow vector corresponding the pixel location of at least the portion of the object.

Aspect 8: The method of any one of aspects 1 to 7; wherein the search area includes at least an estimated pixel position of the at least one feature in the second frame.

Aspect 9: The method of aspect 8, wherein the estimated pixel position is centered within the search area.

Aspect 10: The method of aspect 8, wherein the estimated pixel position is off-center with respect to the search area.

Aspect 11: The method of any one of aspects 1 to 10, wherein the search area comprises a rectangle having a height and a width, wherein the height and width are different.

Aspect 12: The method of any one of aspects 1 to 11, wherein the first frame precedes the second frame in a frame sequence.

Aspect 13: The method of aspect 8, further comprising for each feature of a plurality of features in the first frame, determine a corresponding estimated position of the plurality of features in the second frame.

Aspect 14: The method of any one of aspects 1 to 13, wherein the optical flow prediction comprises a flow target map.

Aspect 15: The method of any one of aspects 1 to 14, wherein the optical flow prediction corresponding to the at least one feature is based on at least a third frame, wherein the third frame precedes the first frame and the second frame in a frame sequence.

Aspect 16: An apparatus for optical flow estimation, comprising: a memory configured to store data corresponding to the one or more frames; and a processor coupled to the memory and configured to: determine an optical flow prediction associated with a plurality of frames; determine a position of at least one feature associated with a first frame; determine, based on the position of the at least one feature in the first frame and the optical flow prediction, a position estimate of a search area for searching for the at least one feature in a second frame; and determine, from within the search area, a position of the at least one feature in the second frame.

Aspect 17: The apparatus of aspect 16, wherein determining the position estimate of the search area comprises offsetting the position of the at least one feature associated with the first frame by an optical flow prediction value of the optical flow prediction associated with the at least one feature.

Aspect 18: The apparatus of aspect 17, wherein the optical flow prediction value associated with the at least one feature is determined based at least in part on the position of a pixel associated with the at least one feature in the first frame.

Aspect 19: The apparatus of any one of aspects 16 to 18, wherein the processor is configured to: perform object detection on the at least one feature to determine an object type associated with the at least one feature; and determine the optical flow prediction based on the object type associated with the at least one feature.

Aspect 20: The apparatus of any one of aspects 16 to 19, wherein a plurality of features associated with the first frame comprises respective features corresponding to pixels of the first frame.

Aspect 21: The apparatus of any one of aspects 16 to 20, wherein the at least one feature associated with the first frame comprises a pixel location of at least a portion of an object in the first frame.

Aspect 22: The apparatus of aspect 21, wherein determining the optical flow prediction comprises obtaining an optical flow vector corresponding the pixel location of at least the portion of the object.

Aspect 23: The apparatus of any one of aspects 16 to 22, wherein the search area includes at least an estimated pixel position of the at least one feature in the second frame.

Aspect 24: The apparatus of aspect 23, wherein the estimated pixel position is centered within the search area.

Aspect 25: The apparatus of aspect 23, wherein the estimated pixel position is off-center with respect to the search area.

Aspect 26: The apparatus of any one of aspects 16 to 25, wherein the search area comprises a rectangle having a height and a width, wherein the height and width are different.

Aspect 27: The apparatus of any one of aspects 16 to 26, wherein the first frame precedes the second frame in a frame sequence.

Aspect 28: The apparatus of aspect 27, wherein the processor is configured to: for each feature of a plurality of features in the first frame, determine a corresponding estimated position of the plurality of features in the second frame.

Aspect 29: The apparatus of any one of aspects 16 to 28, wherein the optical flow prediction comprises a flow target map.

Aspect 30: The apparatus of any one of aspects 16 to 29, wherein the optical flow prediction corresponding to the at least one feature is based on at least a third frame, wherein the third frame precedes the first frame and the second frame in a frame sequence.

Aspect 31: A non-transitory computer-readable storage medium having stored thereon instructions which, when executed by one or more processors, cause the one or more processors to perform any of the operations of aspects 1 to 30.

Aspect 32: An apparatus comprising means for performing any of the operations of aspects 1 to 30.

What is claimed is:

1. An apparatus for optical flow estimation, the apparatus comprising:
    a memory configured to store data corresponding to one or more frames; and
    a processor coupled to the memory and configured to:
        perform object detection on at least one feature associated with a first frame to determine an object type associated with the at least one feature;
        determine an optical flow prediction associated with a plurality of frames based on the object type associated with the at least one feature;
        determine a position of the at least one feature associated with the first frame;
        determine, based on the position of the at least one feature in the first frame and the optical flow prediction, a position estimate of a search area for searching for the at least one feature in a second frame; and
        determine, from within the search area, a position of the at least one feature in the second frame.

2. The apparatus of claim 1, wherein, to determine the position estimate of the search area, the processor is configured to offset the position of the at least one feature associated with the first frame by an optical flow prediction value of the optical flow prediction associated with the at least one feature.

3. The apparatus of claim 2, wherein the processor is configured to determine the optical flow prediction value associated with the at least one feature based at least in part on a position of a pixel associated with the at least one feature in the first frame.

4. The apparatus of claim 1, wherein a plurality of features associated with the first frame comprises respective features corresponding to pixels of the first frame.

5. The apparatus of claim 1, wherein the at least one feature associated with the first frame comprises a pixel location of at least a portion of an object in the first frame.

6. The apparatus of claim 5, wherein, to determine the optical flow prediction, the processor is configured to obtain an optical flow vector corresponding the pixel location of at least the portion of the object.

7. The apparatus of claim 1, wherein the search area includes at least an estimated pixel position of the at least one feature in the second frame.

8. The apparatus of claim 7, wherein the estimated pixel position is centered within the search area.

9. The apparatus of claim 8, wherein the estimated pixel position is off-center with respect to the search area.

10. The apparatus of claim 1, wherein the search area comprises a rectangle having a height and a width, wherein the height and width are different.

11. The apparatus of claim 1, wherein the first frame precedes the second frame in a frame sequence.

12. The apparatus of claim 1, wherein the processor is configured to:
for each feature of a plurality of features in the first frame, determine a corresponding estimated position of the plurality of features in the second frame.

13. The apparatus of claim 1, wherein the optical flow prediction comprises a flow target map.

14. The apparatus of claim 1, wherein the optical flow prediction corresponding to the at least one feature is based on at least a third frame, wherein the third frame precedes the first frame and the second frame in a frame sequence.

15. A method of optical flow estimation, the method comprising:
performing object detection on at least one feature associated with a first frame to determine an object type associated with the at least one feature;
determining an optical flow prediction associated with a plurality of frames based on the object type associated with the at least one feature;
determining a position of the at least one feature associated with the first frame;
determining, based on the position of the at least one feature in the first frame and the optical flow prediction, a position estimate of a search area for searching for the at least one feature in a second frame; and
determining, from within the search area, a position of the at least one feature in the second frame.

16. The method of claim 15, wherein determining the position estimate of the search area comprises offsetting the position of the at least one feature associated with the first frame by an optical flow prediction value of the optical flow prediction associated with the at least one feature.

17. The method of claim 16, wherein the optical flow prediction value associated with the at least one feature is determined based at least in part on a position of a pixel associated with the at least one feature in the first frame.

18. The method of claim 15, wherein a plurality of features associated with the first frame comprises respective features corresponding to pixels of the first frame.

19. The method of claim 15, wherein the at least one feature associated with the first frame comprises a pixel location of at least a portion of an object in the first frame.

20. The method of claim 19, wherein determining the optical flow prediction comprises obtaining an optical flow vector corresponding the pixel location of at least the portion of the object.

21. The method of claim 15, wherein the search area includes at least an estimated pixel position of the at least one feature in the second frame.

22. The method of claim 21, wherein the estimated pixel position is centered within the search area.

23. The method of claim 22, wherein the estimated pixel position is off-center with respect to the search area.

24. The method of claim 15, wherein the search area comprises a rectangle having a height and a width, wherein the height and width are different.

25. The method of claim 15, wherein the first frame precedes the second frame in a frame sequence.

26. The method of claim 15, further comprising:
for each feature of a plurality of features in the first frame, determining a corresponding estimated position of the plurality of features in the second frame.

27. The method of claim 15, wherein the optical flow prediction comprises a flow target map.

28. The method of claim 15, wherein the optical flow prediction corresponding to the at least one feature is based on at least a third frame, wherein the third frame precedes the first frame and the second frame in a frame sequence.

* * * * *